US00RE45868E

(19) United States
(12) Reissued Patent
Yalamanchili et al.

(10) Patent Number: US RE45,868 E
(45) Date of Reissued Patent: Jan. 26, 2016

(54) METHODS OF PREPARING HYDROXY FUNCTIONAL VEGETABLE OILS

(71) Applicant: BioBased Technologies LLC, Rogers, AR (US)

(72) Inventors: Srikanth Yalamanchili, Bentonville, AR (US); Neil Nodelman, Fayetteville, AR (US); David Casper, Normal, IL (US); Trevor Newbold, Salt Spring (CA)

(73) Assignee: BIOBASED TECHNOLOGIES LLC, Rogers, AK (US)

(21) Appl. No.: 14/188,506

(22) Filed: Feb. 24, 2014

Related U.S. Patent Documents

Reissue of:
(64) Patent No.: 8,507,701
Issued: Aug. 13, 2013
Appl. No.: 12/964,908
Filed: Dec. 10, 2010

U.S. Applications:
(63) Continuation-in-part of application No. 11/193,813, filed on Jul. 28, 2005, now Pat. No. 7,893,287, which is a continuation-in-part of application No. 10/924,332, filed on Aug. 23, 2004, now abandoned.

(51) Int. Cl.
*C07C 51/16* (2006.01)
*C08G 18/36* (2006.01)
(Continued)

(52) U.S. Cl.
CPC ..... *C08G 18/36* (2013.01); *C08G 18/6696* (2013.01); *C11B 3/04* (2013.01); *C11C 3/006* (2013.01); *C08G 2101/0025* (2013.01); *C08G 2101/0058* (2013.01)

(58) Field of Classification Search
CPC ..... C08G 18/36; C08G 18/6696; C08G 2101/0058; C08G 2101/0025; C11C 3/006; C11B 3/04
USPC ..... 554/138
See application file for complete search history.

(56) References Cited

U.S. PATENT DOCUMENTS 1,926,769 A 9/1933 Hailwood et al.
2,073,011 A 3/1937 Hubbuch
(Continued)

FOREIGN PATENT DOCUMENTS

DE 4332292 3/1995
WO WO-2006-014521 2/2006

OTHER PUBLICATIONS

Luong et al. Direct Hydroxylation of Fats and Derivatives with a Hydrogen Peroxide Tungstic Acid System. Journal of American Oil Chemists' Society 44:316-320 (1967).
(Continued)

*Primary Examiner* — Jerry D Johnson
(74) *Attorney, Agent, or Firm* — Wilson Sonsini Goodrich & Rosati

(57) ABSTRACT

There is disclosed a process for hydroxylating vegetable oils to create polyols suitable for use in polymer processes, particularly polyurethane processes. The process includes contacting a vegetable oil with hydrogen peroxide and an organic acid having 1-3 carbon atoms under conditions sufficient to oxidize carbon to carbon double bonds found in the vegetable oil. There is also disclosed a vegetable oil based polyol having an acid number of 2.0 mg KOH/g or less. The polyol contains 0.1% w/w or less water, 0.1% w/w or less of the organic acid used to prepare the polyol, and triglyceride groups having fatty acid moieties ranging from $C_{16}$ to $C_{18}$. The fatty acid moieties contain pendant carboxylate groups having from 1 to 3 carbon atoms.

27 Claims, 6 Drawing Sheets

(51) Int. Cl.

| | |
|---|---|
| ***C08G 18/66*** | (2006.01) |
| ***C11B 3/04*** | (2006.01) |
| ***C11C 3/00*** | (2006.01) |
| *C08G 101/00* | (2006.01) |

(56) References Cited

U.S. PATENT DOCUMENTS

| | | | | |
|---|---|---|---|---|
| 2,485,160 | A | 10/1949 | Niederhausen et al. | |
| 2,752,376 | A | 6/1956 | Julian et al. | |
| 3,169,139 | A | 2/1965 | D'Addieco et al. | |
| 4,749,517 | A | 6/1988 | Chwang et al. | |
| 7,279,448 | B2 | 10/2007 | Erhan et al. | |
| 7,560,578 | B2 * | 7/2009 | Ahmad et al. | 554/138 |
| 7,893,287 | B2 * | 2/2011 | Casper et al. | 554/138 |
| 8,308,975 | B2 | 11/2012 | Roh et al. | |
| 8,350,070 | B2 | 1/2013 | Casper et al. | |
| 8,399,693 | B2 | 3/2013 | Yalamanchili et al. | |
| 8,507,701 | B2 | 8/2013 | Yalamanchili et al. | |
| 8,674,124 | B2 | 3/2014 | Newbold et al. | |
| 2006/0041156 | A1 | 2/2006 | Casper et al. | |
| 2006/0041157 | A1 * | 2/2006 | Petrovic et al. | 554/149 |
| 2011/0251411 | A1 | 10/2011 | Newbold et al. | |
| 2011/0313124 | A1 | 12/2011 | Yalamanchili et al. | |
| 2012/0172610 | A1 | 7/2012 | Casper et al. | |
| 2012/0178949 | A1 | 7/2012 | Yalamanchili et al. | |
| 2013/0217798 | A1 | 8/2013 | Sorrell et al. | |

OTHER PUBLICATIONS

Translation of DE4332292.

Friguelli, F., Germani, R., Pizzo, F., and Savelli, G., One Pot-Two Steps Synthesis of 1,2 Dydroxy, Synthetic Communications, 19 (11 & 12), 1939-1943 (1989).

Luong, T.M., et al., JOACS, vol. 44 pp. 316-320, May 1967.

Putilov, A. V., et al., Use of Nitrogen As an Inert Atmosphere for the Gaseous Space of Vessels for Storage of Oil and Oil Products, 140:202144, 2003.

* cited by examiner

METHODS OF PREPARING HYDROXY FUNCTIONAL VEGETABLE OILS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application is a continuation-in-part of U.S. patent application Ser. No. 11/193,813 filed Jul. 28, 2005 (currently pending) which is a continuation-in-part of U.S. patent application Ser. No. 10/924,332, filed Aug. 23, 2004.

FIELD OF THE INVENTION

The present invention pertains to sustainable technologies and sustainable polymer chemistry. Specifically, the present invention pertains to the use of non-petroleum based, natural oils as feed stocks in polymer chemistry processes. More specifically, the invention pertains to the use of vegetable oils as a feed stock for producing polyols used in making polyurethanes.

BACKGROUND OF THE INVENTION

The invention disclosed and claimed herein deals with a novel process of preparing hydroxy functional vegetable oils and the vegetable oils so prepared. Vegetable oils have been familiar to man since prehistoric times and for centuries humans have used plant based fats and oils for food and a variety of other uses. Over the years chemists perfected the science related to the production of oils from agriculture products. Today, millions of pounds of such oils are used in a variety of end user applications. Furthermore, given the finite quantity of petroleum based products, the use of vegetable and plant oils as substitute feed stocks for petroleum is growing exponentially.

Vegetable oils are made up principally of triglycerides containing both saturated and unsaturated fatty acid moieties, wherein the predominant moiety is the unsaturated variety (i.e., the variety having double bond carbon-carbon linkages (C═C) along the fatty acid carbon chain). Even though triglycerides are useful in many chemical applications, there are applications in which their performance can be improved if they are altered to have functionalities different than those that are found in the raw vegetable oil.

For example, triglycerides can be converted to hydroxy functional compounds called "polyols". The addition of "hydroxyl functionality" is typically accomplished by adding hydroxyl groups (—OH) to the carbons. These polyols are then used as reactants to make polymers. The hydroxyl functional groups in polyols can be reacted with isocyanates to make polyurethanes which are a very versatile group of polymers. Polyurethanes can be used in the form of foams, cast resins, coatings, adhesives, and sealants.

In order to use vegetable oils as feed stocks in polyurethane processes, multiple hydroxyl functionality is required. Some vegetable oils, such as castor oils, have a significant degree of hydroxyl functionality built into them. Other vegetable oils must obtain the required hydroxyl functionality through synthetic means. One such means is the hydroxylation of unsaturated vegetable oils via epoxidation or oxidation of the C═C using hydrogen peroxide ($H_2O_2$) followed by ring-opening of the resulting epoxides with proton donors. The present invention is an improvement on this general process.

In addition, most known processes for hydroxylating vegetable oils result in a product that has commercially detrimental aesthetic qualities. For example, many known vegetable based polyols have an unpleasant odor that is carried over into polymer products. Other vegetable based polyols have a degree of coloration that unacceptably tints any polymer made from them.

Vegetable oil based polyols should possess a low acid number (a measure of the remaining fatty acid in the polyols) to function well in urethane systems. Polyols with elevated acid numbers tend to produce sub-optimal polyurethanes because the remaining acids can interfere with catalysts utilized in polymerization reactions and/or participate in unwanted side reactions. Utilizing separate neutralization steps (e.g., adding a base such as KOH to the polyol) can alter the characteristics of the polyol such that its use results in sub-optimal polyurethanes.

Finally, hydrogen peroxide can be explosive under certain conditions and care must be taken to ensure the safety of workers in hydroxylation processes that use hydrogen peroxide as the oxidizing agent for opening the C═C bonds in the fatty acid moieties.

Accordingly, there is a need for a simple, economical, safe, and efficient process for the preparation of polyols that are derived by opening the C═C of the fatty acid moieties of vegetable oils to add hydroxyl groups. In addition, there is a need for simple, economical, safe, and efficiently made polyols that possess a relatively low acid number to allow their use in urethane systems without further neutralization steps.

What has been discovered is a simple, safe, and economical preparative process for the provision of hydroxyl functional polyols of low acid number that are suitable for the formation of polyurethanes, wherein the polyols are derived by opening the alkene groups (C═C bonds) of the unsaturated fatty acid moieties of vegetable oils and adding hydroxyl groups. Also discovered is a unique polyol that is well suited for use in polyurethane applications.

OBJECT OF THE INVENTION

It is therefore one object of the present invention to provide a simple and efficient process for making hydroxyl functional vegetable oils that are suitable for use in industrial chemical processes, including polymer processes.

It is a further object of the invention to provide a continuous process for making hydroxyl functional vegetable oils.

It is a still further object of the invention to provide a hydroxyl functional vegetable oil having a low acid number that is suitable for use in industrial chemical processes, particularly polymer applications, and more specifically urethane applications.

BRIEF SUMMARY OF THE INVENTION

The claimed invention meets these and other objects by providing a method of preparing a polyol having an acid number of not more than about 2 mg KOH/g. The process begins by contacting a vegetable oil containing triglycerides with hydrogen peroxide and an organic acid having from 1 to 3 carbon atoms in the presence of water for a sufficient period of time, at a sufficient temperature, and at a sufficient pressure to hydroxylate carbon to carbon double bonds located along the fatty acid moieties of the triglycerides to form a crude polyol product.

The crude polyol product is then subjected to a separation step to remove volatiles from the crude polyol product to form a semi-refined product. This separation step encompasses both the bulk removal of any aqueous phase and other separation steps (i.e., flash separation, etc.) to remove relatively low boiling volatiles from the crude polyol product.

The semi-refined product is then further reacted at a sufficient temperature and under a sufficient vacuum to achieve a final polyol product having an acid number of not more than 2 mg KOH/g.

Another embodiment of the invention provides a continuous method of preparing a polyol having an acid number of not more than about 2 mg KOH/g. The continuous process begins with the step of continuously charging a reactor with vegetable oil, hydrogen peroxide, and an organic acid having 1 to 3 carbon atoms wherein the charging is conducted at a temperature sufficient to initiate a hydroxylation reaction and at a flow rate that provides a residence time in the reactor sufficient to achieve a crude polyol product having a residual epoxide level of ≤0.7% w/w of oxirane oxygen (using AOCS Official Process, Cd 9-57 for Oxirane oxygen)

The next step in the continuous process encompasses continuously transferring the crude polyol product from the reactor to a volatile separation step wherein the crude polyol product is subjected to heat while under vacuum wherein the heat and vacuum and residence time are sufficient to remove low boiling volatiles and achieve a semi-refined product.

The third step of the continuous process according to the invention encompasses continuously transferring the semi-refined product of the volatile separation step to a further reaction step. In the further reaction step the semi-refined product is subjected to heat while under a vacuum wherein the heat and vacuum and residence time are sufficient to achieve a final polyol product having an acid number of not more than 2 mg KOH/g.

The invention also provides a vegetable oil based polyol having an acid number of 2.0 mg KOH/g or less, 0.1% w/w or less water, and 0.1% w/w or less of the organic acid used to prepare the polyol. The polyol according to the invention also comprises triglyceride groups having fatty acid moieties ranging from $C_{16}$ to $C_{18}$ wherein said fatty acid moieties contain pendant carboxylate groups having from 1 to 3 carbon atoms.

DETAILED DESCRIPTION

Figure 1:
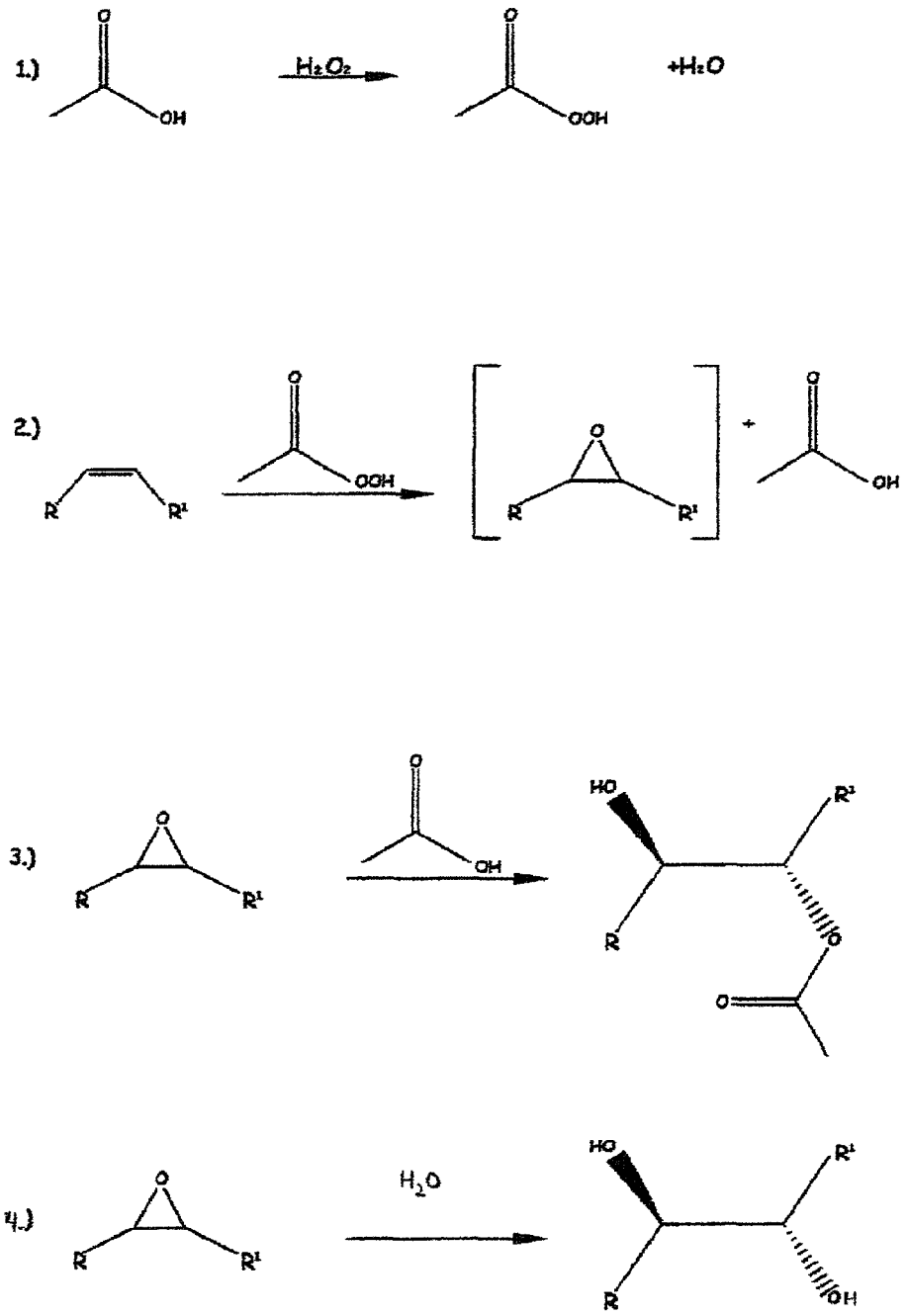
FIG. 1 is a schematic of the proposed reaction scheme to prepare the products of this invention.

In the following description, for purposes of explanation, numerous details are set forth to provide an understanding of one or more embodiments of the present invention. Furthermore, the following detailed description is of the best presently contemplated mode of carrying out the invention based upon the existing experimental data. The description is not intended in a limiting sense, and is made solely for the purpose of illustrating the general principles of the invention.

As used herein, the terms vegetable oil, plant oil, and natural oil are interchangeable and encompass any triglyceride oil that is derived from a plant. The term vegetable oil means a raw vegetable oil that has been obtained by normal processing techniques without any modification to the chemistry of the oil itself (i.e., the oil has not undergone any substantive chemical treatment to alter its level of saturation or unsaturation after its initial production). The vegetable oil can be crude, refined, bleached, deodorized, winterized, partially hydrogenated, bodied or a modified hybrid and can be used as obtained from the producers. The term vegetable oil includes but is not limited to oils selected from the group consisting of corn oil, palm oil, palm kernel oil, soybean oil, cottonseed oil, peanut oil, rapeseed oil, safflower oil, canola oil, olive oil, rice bran oil, sunflower oil, jatropha oil and algae oil.

As used herein the term "organic acid" means an organic acid having 1 to 3 carbon atoms, mixtures of such acids, and mixtures of other acids in which organic acids having 1 to 3 carbon atoms are the primary components. The term "organic acid" includes formic, acetic and proprionic acid. Acetic acid, particularly glacial acetic acid, is a preferred acid for use in the practice of the invention. Many of the examples provided herein utilize acetic acid but the use of acetic acid in the examples should not be interpreted as limiting the scope of the invention.

Preferably, the reactions and procedures discussed herein should be carried out in a glass lined reactor, or a metal alloy reactor such as 316L stainless steel, that is not reactive with hydrogen peroxide or the organic acid used in the practice of the invention. The vessel should also be made of a material that does not impart a color to the product. If a 304 or 316L stainless steel reactor is used, it should be passivated before use.

Passivation consists of cleaning the stainless steel with distilled water and following with a detergent solution at about 49° C. to about 52° C. A 5% w/w solution of sodium hydroxide/water at room temperature is then added and the surface is pickled for one hour. Then nitric acid (30 to 35 weight % aqueous) is added to the reactor and the reactor is aged for about 2 hours at room temperature with agitation. Then it is washed with distilled water. A solution of 5% hydrogen peroxide is then added to the reactor and it is checked for degradation. If no degradation is observed, the hydrogen peroxide is removed and the reactor is ready for use. If the reactor is used for some other type of reaction, the passivation procedure should be repeated.

Turning now to a description of general embodiments of the invention, the invention pertains to the addition of hydroxyl groups or hydroxyl and $C_1$ to $C_3$ carboxylate groups to the C═C bonds along the fatty acid moieties of a vegetable oil triglyceride, to form a polyol that can be useful in the preparation of polyurethanes.

Although the inventors do not wish to be bound by any particular theory regarding the reaction sequence that leads to the formation of the claimed polyol, the following explanation of a possible reaction sequence is offered as an aid to the reader. It is anticipated that additional research will further refine the chemistry underlying the inventive process.

Equation 1 of FIG. 1, depicts the formation of a peracid from the reaction of Hydrogen Peroxide and an organic acid, for example, acetic acid. Thereafter, the peracid reacts with carbon double bonds that are present in unsaturated vegetable oils to form an epoxide ring and regenerating the catalytic organic acid (Equation 2 of FIG. 1). Thereafter, the epoxide ring is opened by the influence of an organic acid to form the hydroxy ester as is shown in equation 3. Alternatively, the epoxide ring is opened by water to form diols (Equation 4 of FIG. 1) or even by previously formed hydroxyl groups to form a hydroxyl ether (not shown).

The invention described and claimed herein more specifically relates to batch and continuous processes of preparing hydroxy functional vegetable oils using epoxidation or oxidation of the C═C bonds located in the fatty acid moiety of vegetable oil triglycerides. Thus, in broad terms, this aspect of the invention comprises contacting a vegetable oil containing triglycerides with hydrogen peroxide and an organic acid having 1 to 3 carbon atoms in the presence of water for a sufficient period of time and at a sufficient pressure, and at a sufficient temperature to form hydroxy esters and dihydroxy compounds from unsaturated moieties in the vegetable oil. Stated alternatively, the components are reacted for a sufficient period of time and at a sufficient pressure, and at a sufficient temperature to hydroxylate carbon to carbon double bonds located along the fatty acid moieties of the triglycerides to form a hydroxyl functional crude polyol product.

Thereafter, the bulk of any aqueous phase and volatiles are removed from the crude polyol product in a separation step that occurs under a vacuum to achieve a semi-refined product. This separation step is to remove relatively "low boiling" volatiles and occurs at temperatures less than about 170° C., preferably less than about 150° C. to 160° C. to avoid coloration of the polyol.

The semi-refined product is then further reacted at a sufficient temperature and under a vacuum for a time sufficient to achieve a final polyol product having an acid number of not more than 2 mg KOH/g. Preferably the temperatures for the further reaction step are at least 170° C., more preferably above 200° C.

Although more detailed, equipment specific examples are provided below; those skilled in the art will readily recognize that there is room for variation in the parameters of the claimed process. For example and as noted above, the vegetable oil that may be used in the practice of the invention may be one of several different oils or mixtures thereof. Likewise, the order of addition of the components is not crucial to the practice of the invention. The components can be combined essentially simultaneously or in sequence where either the organic acid or the hydrogen peroxide is added first. In the continuous process embodiment the components are essentially fed simultaneously.

Continuing now with the general description of one batch process according to the invention, the reaction time for the components must be sufficient to allow the hydroxylation reaction to occur. In most instances 1 to 24 hours will be a sufficient period of time. In continuous processes the feed rates of the components should be adjusted to allow for a steady state, well mixed, residence time of 1 to 24 hours.

The reaction temperature for the components must be sufficient to allow the hydroxylation reaction to occur. Theoretically, the reaction temperature can range from room temperature to the reflux temperature of the reaction mixture. In preferred embodiments the temperature range in the batch process is from about 50° C. to about 150° C.

Figure 2:
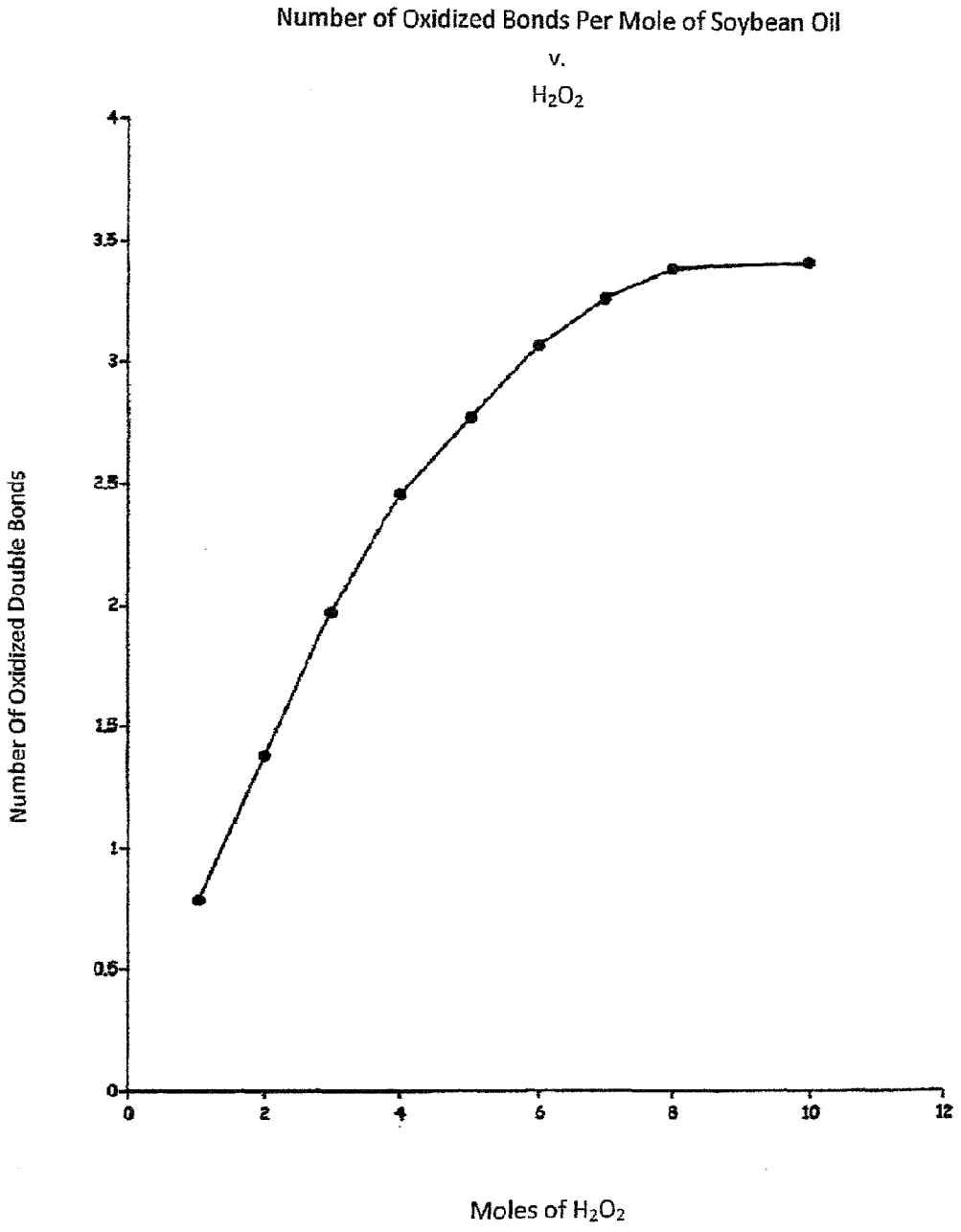
FIG. 2 is a graph of the number of oxidized double bonds per mole of soybean oil versus the moles of hydrogen peroxide used in the reaction to show the effect of excess peroxide.

The relative quantities of each component of the reaction mixture are variable within certain ranges. The amount of hydrogen peroxide that is used ranges from about 0.1 to about 6.0 moles per mole of vegetable oil (i.e., the $H_2O_2$:Veg. Oil ratio ranges from 0.1:1 to 6.0:1). If a lesser amount of hydroxy functionality is desired, then lesser quantities of hydrogen peroxide should be used. Typically, about 6.0 moles of $H_2O_2$ per mole of vegetable oil will result in a hydroxyl number (OH number) of about 200. The effect of the use of greater amounts of the peroxide is illustrated in FIG. 2.

The amount of organic acid that is used is based on the amount of vegetable oil that is used, in that the molar ratio of organic acid to vegetable oil preferably ranges from about 0.5:1 to about 10:1. The organic acid also acts as a solvent and is used in the ring opening reaction.

Other solvents may be utilized in the reaction mixture. Any aprotic solvent may be used other than ethers, as they have been shown to form explosive peroxides.

The water in the reaction comes primarily from the aqueous hydrogen peroxide that is used. At lower concentrations of hydrogen peroxide, more water is added to the system which increases the amount of water that must be removed in a later separation step. In most instances practitioners should find that a 35% solution of hydrogen peroxide works well in the practice of the invention.

As the moles of hydrogen peroxide are increased, so does the number of C═C bonds converted to epoxide. The molar amount of hydrogen peroxide used determines the molar amount of peracid formed. This, in turn, determines the amount of C═C double bonds converted to epoxide, then to hydroxyl compound.

As noted previously, the reaction components are allowed to react under the aforementioned conditions for at least an hour. Samples may be taken at appropriate time intervals to monitor the progress of the reaction. In most instances the initial reaction is allowed to proceed until residual epoxide level is less than or equal to 0.7% (≤0.7%) w/w of oxirane oxygen.

After it has been determined that the reaction has reached the desired conversion point the crude polyol product is subjected to a separation step. The purpose of this separation step is to remove excess acid, water and "low boiling" volatiles from the crude polyol product to obtain a semi-refined product.

This separation step may be accomplished by several different means known to those skilled in the art. For example, the crude polyol product may be sent to a flash tank heated to an appropriate temperature and under vacuum. Alternatively, a wipe film evaporator may be used to conduct this initial separation step. Those skilled in the art are capable of designing other mechanical systems to accomplish this step of the invention and such systems are within the overall scope of this invention. For example, this initial separation step can occur in one step (e.g., a single flash tank) or it can be spread out over several steps (e.g., a flash tank followed by a wipe film evaporator). The primary parameters that govern this step of the process according to the invention are temperature and level of vacuum applied. Those skilled in the art know that these two parameters share an inverse relationship therefore there are multiple combinations of temperature/pressure that may be used in the practice of this step.

In preferred embodiments this initial separation step is conducted at a temperature less than about 170° C. and under a vacuum of at least 50 mmHg More preferably, the temperature during this step of the process is kept at less than 150° C. and most preferably between about 120° C. to 140° C. If the temperature is allowed to rise above 150° C. for too long, the product will start to discolor. The longer that the temperature is at this level, the darker the product becomes and this is to be avoided in this invention. When a vacuum is used it is preferably between 20 mmHg and 50 mmHg.

After the initial separation step the semi-refined polyol product is further reacted by the application of heat. In preferred embodiments this further reaction step is conducted at a temperature sufficient to remove and or react any remaining fatty acids in the polyol to achieve an acid number of not more than 2 mg KOH/g. At this time it is believed that during this additional reaction step, fatty acids generated by unwanted hydrolysis during the oxidation reactions are re-esterified with hydroxyl groups. This theory is based on the observation that using high temperature distillation to further react the semi-refined polyol, following the initial separation step, collects less fatty acid than expected. Applicants anticipate that further experimentation will better define the chemical reactions that occur in this further reaction step.

In most embodiments the temperature of this further reaction step will be at least 170° C. and preferably between 170° C. and about 270° C. Conducting this step under a vacuum is preferred. When a vacuum is used it is preferably less than 20 mm Hg. This step is continued for a time sufficient to achieve a final polyol product having an acid number of not more than 2 mg KOH/g. The final polyol product is also defined by other unique parameters which are discussed in more detail below.

As with the initial separation step, the step of further reacting the semi-refined polyol product to produce a final polyol product may be practiced in a number of ways. The equipment used may include reactors, high temperature vacuum strip reactors, wipe film evaporators, falling film columns, counter current packed columns, steam stripping vessels, distillation and the like. Likewise, the time, temperature and pressure conditions may be varied depending upon the equipment used. However, the temperature and pressures should be monitored so that the final products do not end up with impurities and/or odors or colors. It is anticipated that those skilled in the art will use known means for optimizing chemical processes (i.e., timed sampling to detect acid number) to arrive at the operating conditions most suitable for their particular process.

The process according to the invention also encompasses a method of preparing a hydroxyl functional vegetable oil (i.e., polyol) using a continuous process. Typically, designing a continuous production process is far more challenging as compared to a batch operation but continuous processes are often more cost effective as compared to batch processes and provide a more efficient avenue by which to manufacture product in large volumes.

In batch processing all the raw materials are initially charged into the reactor; the reaction is conducted; then the reactor is emptied of the product and recharged for a subsequent reaction. In a truly continuous process, there is a constant flow of raw materials into a reactor (i.e., a Continuous Stirred Tank Reactor (CSTR)) and the product is continuously produced and collected.

A continuous process presents a more economical way to manufacture products in larger quantities. Initial equipment cost may be slightly higher but the total processing costs are typically lower for a continuous process. A continuous process also allows good control of process parameters such as temperature and pressure and is good practice for conducting exothermic reactions. The total energy required will also be lower and the energy efficiency is higher, because the reactors are maintained at steady state without the need for alternating heating and cooling between the batches.

The proposed reaction mechanism for the continuous process according to the invention is the same as has been described in relation to the batch process and in the parent application (Ser. No. 11/193,813). Briefly, an organic acid forms peracid when contacted with hydrogen peroxide, usually with added heat. This peracid is a strong oxidizing agent and it in turn reacts with the double bonds in unsaturated vegetable oils and forms an epoxide ring thereby releasing the organic acid. This organic acid and/or water (which comes from diluted hydrogen peroxide) opens the ring forming hydroxy esters or diols.

The first stage of the continuous process comprises continuously charging a reactor with vegetable oil, hydrogen peroxide, and an organic acid (or mixture of organic acids) having 1 to 3 carbon atoms wherein the charging is conducted at a temperature sufficient to initiate the hydroxylation reaction. In preferred embodiments this temperature is above about 50° C. and most preferably is the reflux temperature of the reaction mixture which is normally around 105° C. but can vary depending on the composition of the reaction mixture. The flow rate of reactants into the reactor should be such that the rate provides a residence time in the reactor sufficient to achieve a crude polyol product having a residual epoxide level less than or equal to 0.7% (≤0.7%) w/w of oxirane oxygen. This flow rate will necessarily change depending upon the volume of the individual system and the equipment used in the individual system. Those skilled in the art can make the necessary calculations to achieve a suitable residence time for their particular system.

As shown in examples below, the continuous process according to the invention is a robust system that may utilize several different types of equipment. The various pieces of equipment discussed in relation to the batch process are equally applicable here provided they are adapted for use in a continuous process. Preferred equipment is described in the examples that follow.

The proportion of reactants charged to the reactor are within the molar ratios discussed previously in relation to the batch process. The temperature and pressure ranges are within those discussed in relation to the batch process as well.

The second stage of the continuous process according to the invention comprises continuously transferring the crude polyol product from the initial reactor to a separation step that encompasses both the bulk removal of any aqueous phase and the removal of "low boiling" volatiles. In this step the crude polyol product is subjected to heat while under a vacuum. The level of heat and vacuum utilized in this step should be sufficient to remove the low boiling volatiles and achieve a semi-refined product. This step may be accomplished using any of several different pieces of separation equipment known to those skilled in the art and includes those discussed in relation to the batch process version of the invention.

Generally speaking, the temperatures and pressures utilized in the separation step fall within the ranges utilized in the batch process. Those skilled in the art know that the exact operating parameters will depend on the particular equipment utilized to conduct this step. As a general guideline the temperature should be below 170° C. and preferably below 150° C. to avoid coloration of the product. Applicants refer the reader to the specific continuous process examples for more information relating to the interplay between specific equipment and operating parameters.

The third stage of the continuous process according to the invention comprises continuously transferring the semi-refined product of the volatile separation step to a further reaction step where the semi-refined product is subjected to heat while under vacuum wherein the heat and vacuum and residence time are sufficient to achieve a final polyol product having an acid number of not more than 2 mg KOH/g. As with the above described separation step, this further reaction step may be accomplished using any of several different pieces of equipment known to those skilled in the art and includes those discussed in relation to the further reaction step in the batch process embodiment of the invention.

Generally speaking, the temperatures and pressures utilized in the further reaction step fall within the ranges utilized for the further reaction step in the batch process. Those skilled in the art know that the exact operating parameters will depend on the particular equipment utilized to conduct this step. As a general guideline the temperature should be above 170° C. In most instances, the temperature will be above 200° C. and in many instances between about 220° C. and 270° C. Applicants refer the reader to the specific continuous process examples for more information relating to the interplay between specific equipment and operating parameters.

The invention also provides a unique vegetable oil based polyol that is particularly suitable for making a variety of polyurethane products. In general terms, polyurethanes are made by contacting a polyol (usually in the form of a polyol resin blend) with an isocyanate compound. Examples of the urethane systems for which the polyols of the invention are useful include reaction injection molding, castable elastomers and any of the traditional molded or free rise flexible and rigid foams. Such products include "high density" (>20 pcf) or "low density"(≤6 pcf) foams. Such foams are often used in construction applications like spray applied or laminate insulation or for the formation of articles such as ornamental pieces, bun stock and molded or pour-in-place parts. In short, the claimed polyol can be used to manufacture any product typically made from urethane systems that utilize petroleum-based polyether and polyester polyols.

The vegetable oil based polyol according to the invention has an acid number of 2 mg KOH/g or less as it leaves the further reaction step thus making it well suited for immediate use in urethane systems without having to go through any further neutralization or processing steps. This makes the claimed polyol very desirable from an economic perspective.

In addition, the claimed polyol comprises less than 0.1% weight by weight (w/w) of water, less than 0.1% w/w of the organic acids used as the starting materials. Furthermore, the claimed polyol comprises triglyceride groups having fatty acid ester moieties ranging from $C_{16}$ to $C_{18}$ where in said fatty acid moieties contain pendant carboxylate groups having from 1 to 3 carbon atoms as shown in equation 3 of FIG. 1 and FIG. 6.

Figure 6:
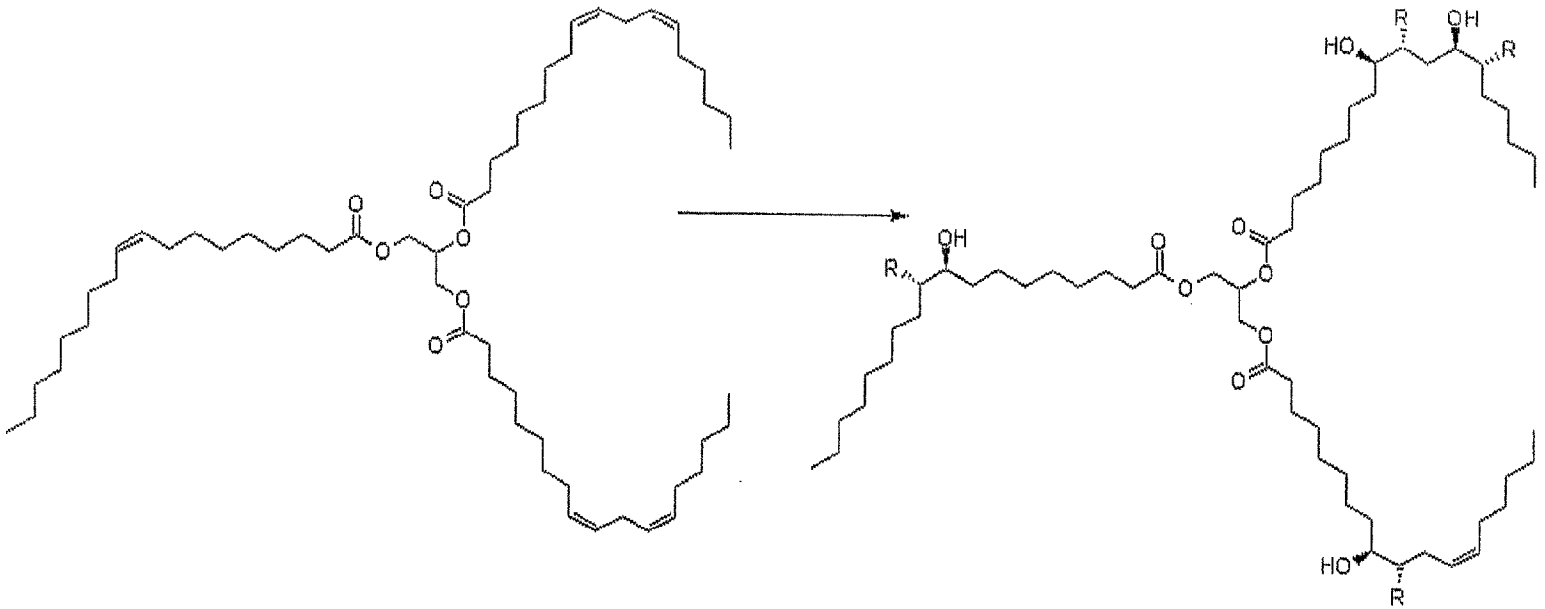
FIG. 6 is a schematic of a transformation of the starting vegetable oil triglyceride to the final polyol product.

In FIG. 6 R═OH or

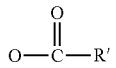

where R' is H, $C_1$ or $C_2$.

The vegetable oil based polyols according to the invention are also freeze/thaw stable, low odor, have a color of less than 0.5 (AOCS Official Process, Cc 13c-50 color spectrophotometer process), and essentially no residual peroxygens. These characteristics are of commercial importance.

Some commercially offered soy-based polyols have suffered from having an odor that is best described simply as being characteristic of soybean oil. This odor is easily detected by the human nose and has been compared to that of stale French fries or old, used cooking oil. The odor which can be found in neat liquid soy polyol, transfers into any foam article made using such polyols. The odor inherent in previously known soy-based polyols has been one factor in such polyols not having widespread and long-running commercial success.

As mentioned previously, the polyols produced in accordance with the invention are of "low odor". "Low odor" for purposes of this invention means that the polyols have a rating of 7 or greater on the SAE J1351 test. This characteristic of the claimed polyol is discussed in more detail in Specific Batch Example 9, below.

The polyols produced according to the invention are also "freeze/thaw" stable. Some raw vegetable oils, such as soybean oil, are not freeze/thaw stable. Even simple cooling of the oil down to about 10° C. will start the process of visible solids precipitating out of the oil. Freezing the oil only accelerates this process. After warming up to ambient temperatures, the small, particulate solids driven out of the oil remain visible to the naked eye. With heat and stirring, the solids can be made to go into solution again. Unless specifically removed, or re-dissolved, these solids could be expected to present downstream handling problems such as filter, valve and orifice plugging. The hydroxylated vegetable oils produced by the present invention maintain freeze/thaw stability and thus completely or substantially eliminate these handling problems. For purposes of this invention, "freeze/thaw stability" means at least 5 cycles of freeze/thaw. This characteristic of the claimed polyol is discussed in more detail in Specific Batch Example 10, below.

The vegetable oil based polyol according to the invention is preferably made in accordance with either the batch or continuous processes discussed previously. Accordingly, the vegetable oils used in the claimed polyol may be selected from the group consisting of corn oil, palm oil, palm kernel oil, soybean oil, cottonseed oil, peanut oil, rapeseed oil, safflower oil, canola oil, olive oil, rice bran oil, jatropha oil, algae oil, and sunflower oil.

The preceding detailed descriptions generally address the batch process embodiment of the invention, the continuous process embodiment of the invention, and the resulting polyol of the invention. The invention also encompasses urethane systems and polyurethane articles formed from the reaction of the claimed polyol and isocyanates.

The specifics of urethane chemistry are known to those skilled in the art and need not be repeated in detail herein. However, it is important to note that the claimed polyols possess characteristics that make it particularly well suited for the manufacture of polyurethane articles.

Accordingly, both the batch and continuous processes according to the invention may comprise the additional step of reacting the final polyol product with an isocyanate in a urethane system to form a polyurethane article, including but not limited to foams, potting compounds, coatings, elastomers, sealants, adhesives and both non-reinforced and fiber reinforced plastics processed using resin transfer molding (RTM), reaction injection molding (RIM) filament winding and pultrusion techniques.

Specifically, the claimed invention encompasses a vegetable oil based polyol as described above that has been reacted with an isocyanate. More specifically, the invention encompasses a polyurethane article whose components comprise the reaction product of an isocyanate and a vegetable oil polyol having an acid number of 2.0 mg KOH/g or less and comprising 0.1% w/w or less water, 0.1% w/w or less of the organic acid used to prepare the polyol, and triglyceride groups bearing fatty acid moieties ranging from $C_{16}$ to $C_{18}$ wherein the fatty acid moieties contain pendant carboxylate groups having from 1 to 3 carbon atoms.

Hydrogen peroxide solutions of high strength (80% or greater) can be made to explode, but they are very insensitive and can only be initiated with difficulty. Mixtures of hydrogen peroxide and organics can also be explosive, and can be made with hydrogen peroxide of moderate strengths (lower limit is 45%). In contrast, high strength hydrogen peroxide/organic mixtures may be extremely sensitive.

Figure 3:
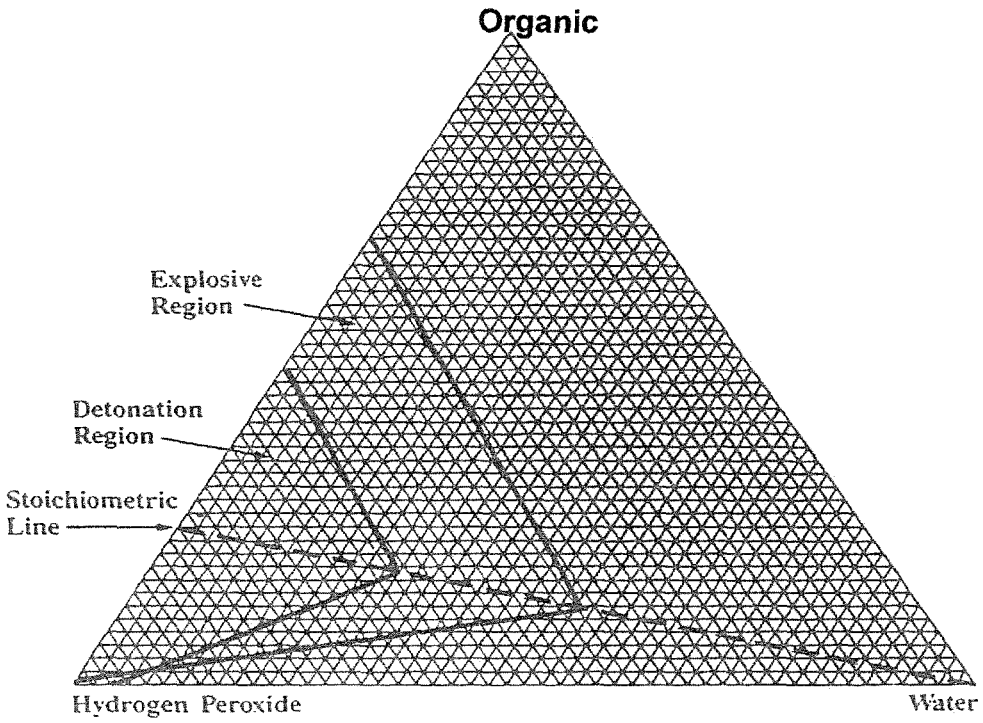
FIG. 3 is a triangular graph showing different explosive regions for peroxide in organic systems.

The triangular graph shown in FIG. 3 shows different regions for hydrogen peroxide/organic mixtures. Also shown are the designations for the organic apex, for the hydrogen peroxide apex, and for the water apex. The stoichiometric line joins the hydrogen peroxide/organic baseline with 100% water through the apex of the explosive area. Explosive power of the mixtures decreases as the composition moves away from the stoichiometric line.

Figure 4:
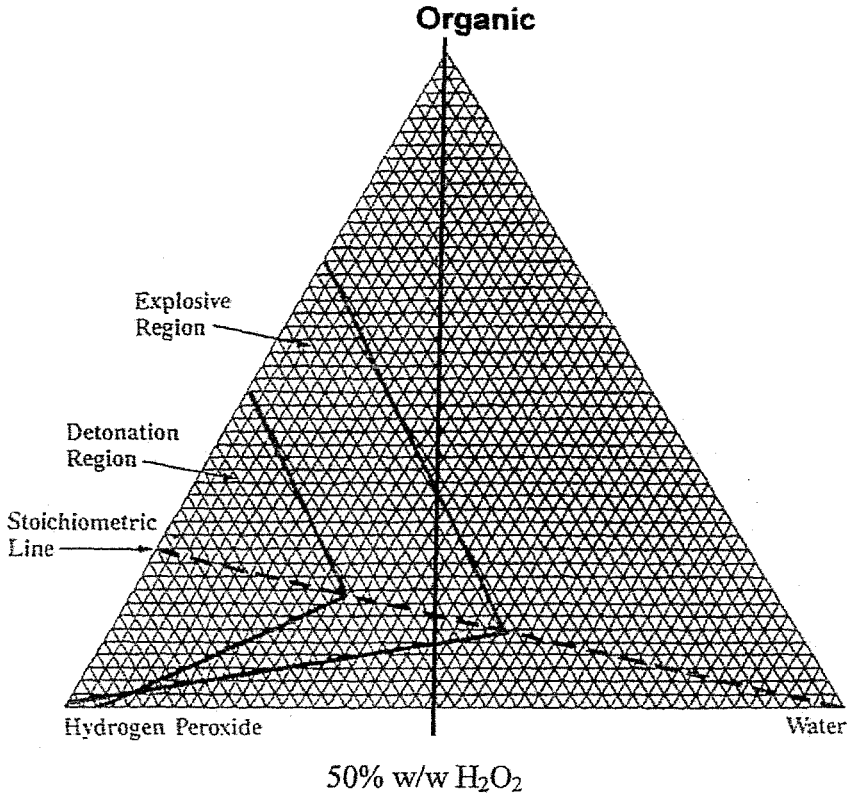
FIG. 4 is a triangular graph for systems using 50% hydrogen peroxide and organic solvent of 100% concentration.
Figure 5:
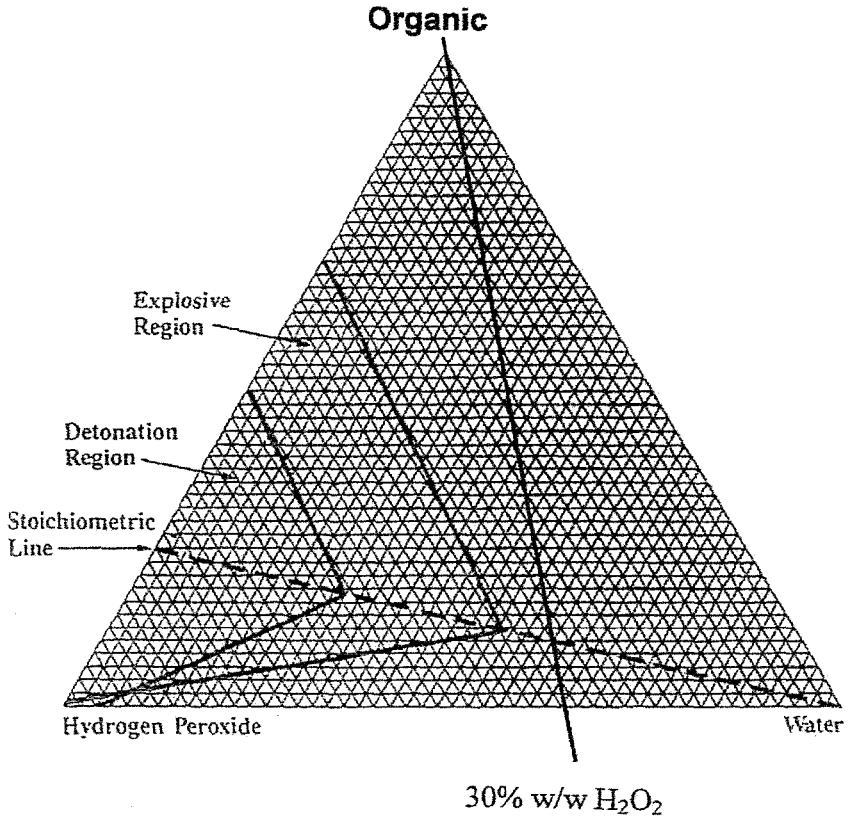
FIG. 5 is a triangular graph for systems using 30% hydrogen peroxide and organic solvent of 100% concentration.

The mixture compositions can be determined by drawing a line between the concentration of the organic solvent and the initial concentration of the hydrogen peroxide. FIG. 4 shows the mixture concentration of 50% hydrogen peroxide initial concentration and an organic solvent of 100% concentration. As shown this line passes through the explosive region and is potentially hazardous. To avoid potential explosive mixtures, the hydrogen peroxide is diluted from 50% concentration to 30% concentration by adding water first before it is mixed with organic solvents as shown in FIG. 5 or by diluting the organic solvent with water before the higher concentration (50%-70% w/w) hydrogen peroxide is metered in.

The non-explosive regions as shown in the Figures are outside of the explosive regions and are the "safe" regions of this invention.

Turning now to more detailed embodiments and examples of the invention, the process according to the invention may be practiced in several different ways. Those skilled in the art will know how to select and or adapt any of the exemplary processes discussed herein to fit the particular requirements of their commercial process. The following paragraphs broadly discuss 7 exemplary processes for practicing the invention. More detailed examples follow this general discussion.

General Example 1

One exemplary process for preparing a pure hydroxyl functional vegetable oil utilizes a standard pressure reactor. This exemplary process comprises contacting vegetable oil with organic acid in a reactor to form an organic phase. The organic acid has from 1 to 3 carbon atoms with acetic acid being a preferred organic acid. Hydrogen peroxide is then combined with acetic acid in water to form an aqueous phase. The aqueous phase is added to the organic phase keeping the amount of hydrogen peroxide in the safe region of the hydrogen peroxide triangle as shown in FIG. 5. The resulting product is cooled to 50° C. to 90° C. while allowing the organic phase and the aqueous phase to separate. The aqueous phase is separated from the organic phase. The organic phase is then moved to a degasser (e.g., flash evaporator). Preferably, the degasser is heated to at least 50° C., preferably between 50° C. to 90° C., and placed under a vacuum of 5 to 15 mm Hg prior to the movement of the organic phase into the degasser. The degasser flashes off the majority of the residual acetic acid and aqueous phase.

After flashing, the crude polyol product is subjected to a first heating step to separate volatiles from the crude polyol product. In this exemplary embodiment the crude polyol product is passed through a wiping film evaporator heated to a temperature between about 60° C. and about 140° C. at about 5 to 20 mm Hg of vacuum at a wipe speed of about 300 to 350 rpm and a feed flow rate of about 25 to 45 pounds per hour while maintaining the internal condenser temperature at about 0° C. to about 12° C. to complete the step of removing volatiles. The semi-refined polyol product is then fed to a second wiping film evaporator for a pass at about 0.001 to 0.003 mmHg, about 220° C. to 260° C., a wipe speed at about 300 to 350 rpm, and a feed flow rate of about 25 to 35 pounds per hour while maintaining the internal condenser temperature at about 35° C. to 70° C. The final product is then cooled and recovered.

General Example 2

Another general example of this invention is a process of preparing a polyol utilizing a pressure reactor. The process comprises providing a pressure reactor that is capable of being sealed. Vegetable oil, acetic acid and necessary water (required to dilute hydrogen peroxide to 35% w/w concentration in the reaction mixture) are added to the pressure reactor to form an organic phase and an aqueous phase. The reactor is sealed and heated to about 85° C. to 120° C. (if it was not already preheated) with agitation. Hydrogen peroxide (35% to 70% w/w) is metered into the heated reactor. The reaction mixture is heated to between about 120° C. to 135° C. under a pressure of about 12-45 psig for about 1.5 to 3 hours followed by cooling the mixture to about 50° C. to 90° C. without agitation. The aqueous phase is removed from the pressure reactor followed by stripping off the bulk of the remaining acetic acid, aqueous phase and other low boilers at about 90° C. to 150° C. and 5 to 60 mm Hg. The crude polyol product is then placed under a vacuum of about 2 to 15 mm Hg under a nitrogen sparge and subject to further reaction at about 220° C. to 260° C. until the reaction mixture tests for an acid number of 2.0 mg KOH/g or less.

General Example 3

Another general example of this invention is a process of preparing a polyol in which the aqueous phase is recycled and the step of removing volatiles from the crude polyol product is accomplished using a degasser/flash tank. The process comprises contacting a vegetable oil (e.g., soybean oil) with acetic acid to form an organic phase along with combining hydrogen peroxide and acetic acid in water to form an aqueous phase then adding the aqueous phase to the organic phase in a standard reaction vessel (while keeping the amount of hydrogen peroxide in the safe region as noted in FIG. 5). Sufficient heat is applied for the hydroxylation reaction to occur. The reaction mixture exiting the reaction is cooled to about 50° C. to 90° C. The organic phase is separated from the aqueous phase. The aqueous phase is moved to a holding tank and recycled. The organic phase containing the crude polyol product is transferred to a degasser that is heated to at least 50° C. to 90° C. and 5 to 15 mm Hg prior to the movement of the organic phase into the degasser. The degasser flashes off the majority of the residual acetic acid and aqueous phase. The collected acetic acid and aqueous phase are then sent to a fractional distillation column for recovery and recycling. The remaining organic phase containing the crude polyol product is then fed to a first wiping film evaporator and subjected to a first pass at about 5 to 15 mmHg, about 60° C. to 140° C., wipe speed of about 300 to 350 rpm and a feed flow rate of about 25 to 45 pounds per hour while maintaining the internal condenser temperature at about 0° C. to 12° C. The evaporate is collected and placed in an acid holding tank.

The semi-refined product is then fed to a second wiping film evaporator where it is subject to further reaction. The product is sent through the wiping film evaporator at about 0.001 to 0.003 mmHg, 220° C. to 250° C., wipe speed at about 300 to 350 rpm and a feed flow rate of about 25 to 45 pounds per hour while maintaining the internal condenser temperature at about 35° C. to 70° C. Again, the evaporate is collected and placed in an acid holding tank. The final product is then cooled and recovered.

General Example 4

Another general example of the invention is a process of preparing a polyol utilizing a pressure reactor and distillation column. The process according to the invention comprises providing a pressure reactor that is capable of being sealed; adding vegetable oil to acetic acid and necessary water (required to dilute hydrogen peroxide to 35% w/w concentration in the reaction mixture) in the pressure reactor to form an organic phase and an aqueous phase; sealing the reactor and heating to about 85° C. to 120° C. with agitation; metering a 35% to 70% w/w of hydrogen peroxide to the hot mixture; heating the reaction mixture to about 120° C. to 135° C. under a pressure of about 12 to 45 psig for about 1.5 to 3.0 hours and then quenching the reaction mixture containing the crude polyol product to about 50° C. to 90° C. without agitation. The aqueous phase is separated from the pressure reactor to a distillation column for the recovery of the acetic acid.

The process continues with the stripping off bulk of the acetic acid, aqueous phase and other low boilers from the product at 90° C. to 150° C. and 5 to 60 mm Hg and moving the acetic acid, aqueous phase and other low boilers to a distillation column for recovery of the acetic acid.

The remaining organic phase product is then subjected to a negative pressure of about 2 to 15 mm Hg under a nitrogen sparge while heating the product to about 220° C. to 260° C. until the reaction mixture tests for an acid number of 2 mg KOH/g or less, preferably 1 or less, most preferably 0.5 or less. The final product is then cooled and collected.

General Example 5

Another general example of this invention utilizes a packed column in implementing the step of removing fatty acids from the crude polyol product. In this example the crude polyol product is formed and the low boiling volatiles are separated as in the previous examples. Thereafter, the semi-refined polyol product is further reacted at a temperature in the range of about 220° C. to 250° C. while being moved downwardly through a packed column while forcing, under pressure, a material selected from the group consisting of steam and a gas non-reactive with the crude polyol product or any remaining vegetable oil, up through the packed column. The final product is cooled and collected.

General Example 6

Another exemplary process for preparing the polyol according to the invention utilizes atmospheric reflux with a wiping film evaporator. In this process, the reaction takes place in a two phase system within a reactor. The vegetable oil is dissolved in acetic acid forming the organic phase. The oxidant, that is, a peroxy organic acid, is generated in situ by the addition of 35 to 70% w/w hydrogen peroxide. This gives rise to the aqueous phase. At room temperature the reaction between these components is not evident. Heating to about 85° C. to 110° C. generates peracetic acid in situ, and aging at that temperature under reflux takes the reaction to completion.

The oxidant is split in proportionately between the aqueous and organic phases, with the higher concentration found in the aqueous phase. It is believed that the oxidant diffuses across the interfacial boundary separating the phases, where it finds and reacts with double bonds in the vegetable oil to form the polyol. This process repeats itself until the alkenes have been converted to hydroxyl groups, resulting in the hydroxy functional polyol.

The resulting mixture is then cooled to approximately 50° C. to 90° C. for phase separation and the agitator shut off in order to avoid the formation of an emulsion. The lower aqueous phase is diverted to a holding tank for analysis. Approximately 80 to 85% w/w of this stream is recycled to the next reaction batch. The organic phase is transferred to a wiping film evaporator feed tank.

The next step is to flash off the bulk of the acetic acid and aqueous phase remaining in the product. This step leaves a small amount of acetic acid and water in the polyol product. The condensate collected from this step is fed to the fractional distillation column feed tank for recovery.

The crude polyol product is then fed to a wiping film evaporator for a first pass at about 15 to 20 mm Hg, 60° C. to 140° C., wipe speed of 300 to 350 rpm and a feed flow rate of about 25 to 45 pounds/hour to form a semi-refined product. The semi-refined product is then further reacted by passing it through the wiping film evaporator a second time at about 0.001 to 0.003 mm Hg, 220° C. to 250° C., wipe speed of 300 to 350 rpm and a feed flow rate of about 25 to 45 pounds/hour. The internal condenser temperature is maintained at 35° C. to 70° C. and a fatty acid distillate is collected at this step.

General Example 7

Another general example of this invention utilizes a pressure reactor and a vacuum sparge strip process and is conducted initially as in the previous general examples, in that, the vegetable oil is added to acetic acid to form an organic layer and an aqueous layer.

The reactor is sealed and the contents heated to about 85° C. to 120° C. with agitation. The oxidant is formed by the metered addition of hydrogen peroxide to the reaction mixture. At room temperature, the reaction between these components is very slow or non-existent, however, with agitation and heating, they react to form the oxidant (e.g., peroxy organic acid). The pressure in the reaction vessel at this point is on the order of 0 to 25 psig.

After all of the hydrogen peroxide has been added, the reaction mixture is heated to about 125° C. to 135° C. and controlled at that temperature with cooling, if necessary. The oxidant is split in proportionately between the aqueous and organic phases, with the higher concentration found in the aqueous phase during the reaction.

After about 2 hours, at a temperature of about 125° C. to 135° C. and pressure of about 15 to 35 psig, the reaction is cooled to about 50° C. to 90° C. with minimal agitation to avoid the formation of an emulsion. The organic and aqueous phases separate and the aqueous phase is diverted to a holding tank for peroxygen content analysis. This stream is then transferred to the feed tank of a distillation column for the recovery of acetic acid. The organic phase is then transferred to a vacuum strip vessel or it is stripped in the reactor to remove low boiling volatiles and any remaining aqueous components.

When using a vacuum strip vessel, the bulk of the acetic acid, aqueous phase and low boilers are stripped at about 90° C. to 150° C. and under a vacuum of about 5 to 60 mm Hg. At this vacuum level, coolant is required on the condenser and receiver to capture the distillates and ease the load on the vacuum pump that should be equipped with a low temperature trap. The condensate is collected and transferred to the fractional distillation column feed tank for acetic acid recovery. This leaves the semi-refined product with trace amounts of acetic acid, water, high boilers and some amount of fatty acids to be removed or re-esterified in the high temperature further reaction step.

The crude polyol is then further reacted in the same vessel in which the vacuum level is raised to 2 to 15 mm Hg, while maintaining a small nitrogen sparge and heating the batch to about 220° C. to 250° C. The fatty acid begins to re-esterify and/or distill off beginning at about 175° C. Preferably this further reaction step is conducted between about 175° C. to 250° C. The further reaction step is continued until the acid number reaches 2.0 mg KOH/g or less, preferably 1 or less, most preferably 0.5 or less. The product is cooled to 50° C. to 70° C. An antioxidant may then be added followed by filtration through 100 to 250 micron filter media before transferring to storage.

Specific Batch Examples

Example 1

Into a 500 ml. glass flask, there was added 20 gms. (19.52 mmoles) of solvent-free crude soybean oil at room temperature. To the soybean oil were added 40 ml. of glacial acetic acid and 10.71 ml of 35% hydrogen peroxide, for a molar ratio of peroxide to soybean oil of 6:1.

This mixture was heated to reflux for about 1 hour, at which time the reaction mixture was clear. The reaction mixture was cooled down enough to handle the materials and the materials were placed in a glass separatory funnel and the bottom layer, (mostly acetic acid) was removed. The top layer was washed with saturated sodium bisulfite, sodium bicarbonate (saturated solution) followed by saturated sodium chloride solution. The material was then transferred to an Erlenmeyer flask and dried over magnesium sulfate and then stripped of any solvent and volatiles by using a rotary evaporator.

An FTIR analysis showed a large OH stretch at approximately 3300 $cm^{-1}$ and a reduction in $sp^2$ CH stretch at approximately 3050 $cm^{-1}$ indicating that the C═C bonds in the molecule had been converted to hydroxyl (Table I).

TABLE I

| Acid No. (mg KOH/g) | No. of Oxidized Double Bonds/mole of soybean oil | OH No. (mg KOH/g) | Color |
|---|---|---|---|
| 0.92 | 4.27 | 185 | 0.81 |

Example 2

A second run was made as in the first example, except 4 moles of hydrogen peroxide per mole of soybean oil was used. The reaction mixture comprised 20 gms. of crude soybean oil, 40 ml of glacial acetic acid, and 6.7 ml of hydrogen peroxide. The reaction was run at reflux for 1 hour. FTIR analysis showed the formation of hydroxy compound, with a lesser reduction of $sp^2$ CH stretch at 3050 $cm^{-1}$ than showed in Example 1 (Table II).

TABLE II

| Acid No. (mg KOH/g) | No. of Oxidized Double Bonds/mole of soybean oil | OH No. (mg KOH/g) | Color |
|---|---|---|---|
| 0.48 | 3.00 | 169 | $6.6 \times 10^{-2}$ |

Example 3

A third run was made as in the first example, except there was used 3 moles of hydrogen peroxide per mole of soybean oil. There was used 20 gms. of crude soybean oil 40 ml. of glacial acetic, and 5.0 ml of peroxide. The reaction was run for 1 hour at reflux. The FTIR results were the same as Example 2. (TABLE III).

TABLE III

| Acid No. (mg KOH/g) | No. of Oxidized Double Bonds/mole of soybean oil | OH No. (mg KOH/g) | Color |
|---|---|---|---|
| 0.95 | 1.99 | 117 | 1.26 |

Example 4

Another run was carried out in which a combination of two acids was used. To a 1 liter round-bottomed glass flask was added 100 gms of crude soybean oil, 17 ml of Glacial acetic acid and 35% hydrogen peroxide. To this mixture was added 11.1 ml of formic acid (a 1:1 molar ratio with the acetic acid). This mixture was allowed to heat at a low temperature (50° C.). The reaction mixture exothermed over the next 186 minutes to about 105° C. The reaction was then maintained at 105° C. and allowed to stir for an additional 3 hours. After the reaction was complete, as was evidenced by the disappearance of the color of the reaction mixture, the acid was removed along with water to yield a quantitative conversion of alkene to polyol by FTIR.

Example 5

A 15 gallon 316L stainless steel reactor equipped with an agitator and reflux condenser was passivated and purged with nitrogen. The agitator was started and the reactor was vented through the reflux condenser. A small amount of chilled water was introduced to the reflux condenser and a low volume nitrogen sweep was provided to the reactor.

The reactor was charged with 16 pounds of distilled water followed by 29 pounds of glacial acetic acid and 57 pounds of soybean oil. The materials were allowed to mix for 10 minutes.

Eight (8) pounds hydrogen peroxide (70% w/w) was metered from a day tank to the reactor over 30 minutes, while maintaining turbulent agitation. The reactor was fitted with a reflux condenser and coolant was flowing through the condenser and available if needed for the reactor jacket. No reaction or exotherm was observed at this time.

At the finish of the addition of the oxidant, the reaction was heated to about 85° C. to 90° C. At this temperature there is sufficient heat to overcome the reaction activation energy of the reactants. Once the reaction was initiated, there was an exotherm which raised the reaction mixture to its boiling point of approximately 110° C. Boiling was vigorous initially but tapered off within the first 30 to 45 minutes. Then, external heating was required to maintain a vigorous reflux at about 110° C. and drive the reaction to completion. At the start of the reaction, the mass was yellow orange in appearance. It gradually faded to a beige colored, free flowing liquid as the reaction ended three hours later.

The reaction mixture was cooled to 70° C. to 80° C. and allowed to phase separate. The upper organic layer contained polyol/acetic acid and the lower aqueous phase contained water/acetic acid/polyol and some peroxygen. The organic layer was beige in color, had the appearance of an emulsion and was viscous at room temperature but very fluid at 70° C. to 80° C. The aqueous layer however, was virtually colorless, transparent and non-viscous. The interface between the two phases was distinct and without a rag edge.

After standing for about 45 minutes, the phases were separated and the aqueous layer was transferred to a holding tank and sampled for analysis. Approximately 80% to 85% of this stream was recycled to the next batch of reactants. There were three components of interest from the analysis, namely, water, acetic acid and peroxygen. This information was used to adjust the charge of these three components to the next batch reaction. The remaining 15% to 20% of this stream was transferred to a fractional distillation column feed tank for acetic acid recovery.

The organic layer containing the polyol was then transferred to a wiping film evaporator feed tank where it was pre-heated to 60° C. The organic layer was then treated in the following manner. It was subjected to a flash evaporator (degasser) and two wiping film evaporators oriented in series with the product from the first unit feeding the second wiping film evaporator.

Before feeding to the first wiping film evaporator, the organic phase of the reaction containing the crude polyol product was fed to a flash evaporator to remove the bulk of the acetic acid and aqueous phase. The flash evaporator was operated at a vacuum of about 14 mm Hg and a temperature of about 115° C. The polyol rich stream leaving the flash evaporator was diverted to the first wiping film evaporator and the acetic acid/aqueous phase distillate was moved to a fractional distillation column feed tank.

The feed for the first wiping film evaporator having a heated surface area of approximately 2.35 $ft^2$ was preheated with agitation. This unit was then evacuated using a vacuum of about 14 mm Hg. The wall temperature was raised to 115° C. and the wiper speed adjusted to 320 rpm. Feed was then introduced to the unit at a rate of 31.3 pounds/hour. The product and distillate streams were diverted to clean empty containers until steady state was achieved. Once the process reached equilibrium, the product was diverted to the feed tank for the second wiping film evaporator and the condensate was diverted to a fractional distillation column feed tank for the recovery of the acetic acid.

The material leaving the first wiping film evaporator had an acid number of about 4 mg KOH/g, no peroxygens, less than 0.1% w/w water and less than 0.1% w/w acetic acid. This stream was the one fed to the second wiping film evaporator.

The second wiping film evaporator was preheated to 60° C. with agitation. The unit was then evacuated using a vacuum of 0.001 mm Hg. The wall temperature was raised to 240° C. and the wiper speed adjusted to 320 rpm. The feed was then introduced to the unit at a rate of 25.35 pounds per hour.

The product and distillate streams were diverted to clean empty containers until steady state was achieved. Once the process reached equilibrium the product was collected in the product holding tank. The condensate was transferred to the fatty acid holding tank.

The product had an acid number of less than 1, there were no peroxygens, less than 0.1% w/w water and less than 0.1% w/w acetic acid.

Example 6

This example discusses the handling of the discharge streams from the prior example (Example 5).

There were four discharge streams of interest, namely, the aqueous phase from the reaction, the distillate from the degasser, the distillate from the first pass on the wiping film evaporator, and the distillate from the second wiping film evaporator.

The aqueous phase isolated from the reaction contained recoverable quantities of acetic acid, water and polyol. After separation, the stream was analyzed for the components set forth above. The results were used to adjust the charge of pure acetic acid, and water to the next reaction. Approximately 80% to 85% w/w of the stream was recycled to the next batch. The remainder, about 15% to 20% w/w was quenched with sodium metabisulphite and transferred to the fractional distillation column for recovery of acetic acid.

The distillate recovered from the wiping film evaporators was transferred to a fractional distillation column for purification. The distillation column was gradually heated to 116° C. At about 80° C. overhead temperature, a water rich stream started to distill from the vessel. This stream had an aromatic odor indicating the presence of low boiling light ends. The overhead distillate was condensed and collected as a water rich stream. This was continued until the pot temperature reached 117.9° C. and the overhead temperature reached 103.5° C. When the pot temperature reached 120° C. and the overhead temperature settled at 117° C., the acetic acid rich stream was transferred to the recovered acetic acid holding tank. The purity of this material was about 97.4% w/w and the standard recovery was 92.28%.

The waste stream from this process was the bottoms from the fractional distillation column which consists primarily of water, light ends and discolored bottoms of the reaction.

Example 7

A 60 gallon 316L stainless steel reactor equipped with an agitator and a reflux condenser was passivated and purged with nitrogen. The agitator was started and the reactor was vented through the reflux condenser. Coolant was applied to the reflux condenser and a nitrogen sweep on the reactor began.

The reactor was charged with 192 pounds of RBD (refined, bleached deodorized) soybean oil followed by 102 pounds of glacial acetic acid, and 41 pounds of distilled water. The reactants were allowed to mix for 15 minutes with agitation. The reactor was sealed and heated to 110° C. with agitation that created a pressure of about 20 to 25 psig.

Forty one (41) pounds of 70% hydrogen peroxide was metered from a day tank to the reactor over 120 minutes at a rate of 0.34 pounds/minute. The reactor pressure ranged between about 30 to 35 psig. Coolant was applied to the reactor jacket as needed to control the batch temperature at 110° C. plus or minus 2° C. during the hydrogen peroxide addition.

After the hydrogen peroxide was charged, the reaction mixture was heated to 130° C. and aged for 45 minutes. At this temperature, the reaction was mildly exothermic and the reactor pressure ranged between 40 and 45 psig. Coolant was applied to the reactor jacket as needed to control the batch temperature to about 130° C. plus or minus 2° C.

The reaction mass at the start was viscous with a yellow to orange appearance. It then turned to an orange-red appearance early in the reaction, gradually fading to a beige colored, free flowing liquid at the end of the reaction.

Approximately one hour after the hydrogen peroxide addition, the batch was sampled and analyzed, using HPLC, to determine completion of the reaction. The reactor was then cooled to 40° C. with minimal agitation to avoid formation of an emulsion.

After the mixture phase separated, the upper organic layer contained polyol and acetic acid and the lower aqueous phase contained water, acetic acid, polyol, fatty acid and peroxygen. The organic layer had the appearance of an emulsion and was viscous at 40° C. but very fluid at 70° C. to 80° C. The aqueous layer was virtually colorless, transparent and non-viscous. The interface was distinct and with a rag edge.

After approximately 120 minutes, the phases were separated and the aqueous layer was transferred to a holding tank and sampled for analysis. There were three components of interest, namely, water, acetic acid and polyol. This information is used to adjust the charge of these three components to the next batch if the stream is recycled. The remaining 15% to 20% of this stream was transferred to the fractional distillation column feed tank for acetic acid recovery.

The organic layer containing the polyol was transferred to a vacuum strip vessel for to remove volatiles and the unit was filled to about 85 to 90% of its capacity. The vessel was equipped with a condenser and distillate receiver and coolant was applied to the condenser. An approximately 60 mm Hg vacuum was applied to the vessel via the condenser. The vessel was heated to 140° C. and held at that temperature until flow of distillate ceased.

A nitrogen sparge of 32 standard cubic foot/hour per 100 pounds of product was applied to the strip vessel while maintaining good agitation. The batch was heated to 230° C. and at about 170° C. a white vapor was observed leaving the surface of the liquid. This material was fatty acid. A sample was taken for fatty acid analysis every hour after the batch temperature reached 200° C. When the acid number fell below 0.5 mg KOH/g, this step was terminated.

The pure product had an acid number of less than 0.5 mg KOH/g. It contained no peroxygen, had less than 0.1% w/w water and less than 0.1% w/w acetic acid.

Example 8

Odor Testing

This example was carried out to test the odor of the polyols produced by the process as set forth in Examples 1-3. Tested were polyols of 117, 168, and 185 hydroxyl numbers. (See Tables I-III). All three polyols were visually clear.

The above-mentioned polyols were compared against the following polyols. Arcol® LG-168, a petroleum-based polyether triol made by the addition of propylene oxide to a glycerin-based initiator compound. The material is available from Bayer Material Science Corporation and has typical properties of 1000 molecular weight, water white color, visual clarity, characteristic polyether polyol odor, terminal secondary hydroxyls and a hydroxyl number in the range of 158 to 178 mg KOH/g. Soyol® R3-170E, is a soybean oil-based product designed for use in a wide range of polyurethane applications. The material is available from the Urethane Soy Systems Company. Reported properties are: a functionality of 3, a hydroxyl number in the range of 160 to 180 mg KOH/g, an acid number in the range of 0.5 to 2.5 mg KOH/g and a 25° C. viscosity in the range of 1000 to 1500 mPa s. The product is yellow in color, opaque to visible light and reveals an odor suggestive of crude soybean oil. SoyOyl® GC5N is a soybean oil-based product for semi-flexible and rigid foam applications from the Urethane Soy Systems Company. Typical reported properties include a functionality of 3, a hydroxyl number of 275 mg KOH/g and 25° C. viscosity of 2700 mPa s. The product contains significant levels of added glycerin and sucrose. The product is amber in color, lacks visual clarity and reveals an odor suggestive of crude soybean oil.

SoyOyl® P38N is a soybean oil-based product for flexible urethane applications offered by Urethane Soy Systems Company. Typical properties include a functionality of 2, a hydroxyl number of 53 mg KOH/g and 25° C. viscosity of 2800 mPa s. The product is amber in color, visually clear and reveals a strong odor suggestive of raw soybean oil.

The protocol for testing of inherent odor of a polyol was based on a combination of the SAE J1351 and General Motors GME 60276 odor testing procedures. The experimental conditions from the SAE procedure and the grading scale from the GME procedure were used. The test involved providing 10 grams of each candidate polyol each weighed into a separate new, cleaned and dried 1-quart metal can. The lids were placed in position, but not firmly sealed and the cans were placed in a 65° C. air-circulating oven for one hour. One empty can was included as a control.

Upon removal from the oven, each can was evaluated for odor by a panel of 3 trained and experienced people. To allow for more discrimination between samples the normal 1 to 5 rating scale of the SAE J1351 test was replaced by the following GME-based test ratings scale.

| Odor Perception | Score |
|---|---|
| Odorless | 10 |
| Just Noticeable | 9 |
| Noticeable | 8 |
| Slight | 7 |
| Tolerable | 6 |
| Borderline Tolerable | 5 |
| Objectionable | 4 |
| Annoying | 3 |
| Very Annoying | 2 |
| Intolerable | 1 |

The results:

| Sample | Panelist Number | Sample Rating | Average Rating |
|---|---|---|---|
| Empty Can | 1 | 10 | 10 |
| | 2 | 10 | |
| | 3 | 10 | |
| Arcol LG - 168 | 1 | 8 | 8 |
| | 2 | 8 | |
| | 3 | 7 | |
| Polyol Example 3 | 1 | 7 | 7 |
| | 2 | 7 | |
| | 3 | 7 | |
| Polyol Example 2 | 1 | 8 | 8 |
| | 2 | 7 | |
| | 3 | 8 | |
| Polyol Example 1 | 1 | 7 | 7 |
| | 2 | 8 | |
| | 3 | 7 | |
| Soyol R3-170-E | 1 | 5 | 6 |
| | 2 | 6 | |
| | 3 | 7 | |

-continued

| Sample | Panelist Number | Sample Rating | Average Rating |
|---|---|---|---|
| SoyOyl GC5N | 1 | 7 | 6 |
| | 2 | 6 | |
| | 3 | 6 | |
| SoyOyl P38N | 1 | 3 | 4 |
| | 2 | 3 | |
| | 3 | 6 | |

The data in the above table just above shows that the liquid polyol samples of this invention had a slight odor or better on the GME rating scale. Two of the samples, the petroleum-based polyol Arcol LG-168 and the inventive soy Polyol from Example 2 received a rating of 8 indicating that the panel was able to notice an odor but had no further comment about that. The inventive soy polyols Polyol from Examples 3 and 1 received the next highest rating of 7 indicating that an odor was noticeable but was not objectionable to any of the panelists.

Example 10

Freeze/Thaw Stability

The protocol for testing the freeze/thaw stability of a polyol begins by placing 80 grams of a neat polyol into a 120 milliliter wide-mouth, clear, glass jar. The lid is securely tightened and the glass jar is placed in a 0° C. freezer for 4 hours. After the freezing period, the sample is removed from the freezer and allowed to warm up to ambient laboratory temperature (about 24° C.) overnight. The following morning, the sample is visually inspected to check for the presence of precipitated particles, suspended particles, floating particles or a visible haze of any kind. The % T notation refers to the percent transmission of visible light through the sample. The process is then repeated for 5 separate freeze thaw cycles. The results of the freeze/thaw stability testing are presented in the following table.

TABLE

Freeze/Thaw Stability Testing Results

| Sample | Initial Appearance | Number of Freeze/Thaw Cycles 1 | 2 | 3 | 4 | 5 |
|---|---|---|---|---|---|---|
| Arcol LG-168 | Water White | No Change | ✓ | ✓ | ✓ | ✓ |
| | Visually Clear (100% T) | No Change | ✓ | ✓ | ✓ | ✓ |
| | No Visible Solids | No Change | ✓ | ✓ | ✓ | ✓ |
| Polyol from Example 1 | Light Amber Color | No Change | ✓ | ✓ | ✓ | ✓ |
| | Visually Clear (100% T) | No Change | ✓ | ✓ | ✓ | ✓ |
| | No Visible Solids | No Change | ✓ | ✓ | ✓ | ✓ |
| Polyol from Example 2 | Light Amber Color | No Change | ✓ | ✓ | ✓ | ✓ |
| | Visually Clear (100% T) | No Change | ✓ | ✓ | ✓ | ✓ |
| | No Visible Solids | No Change | ✓ | ✓ | ✓ | ✓ |
| Polyol from Example 3 | Light Amber Color | No Change | ✓ | ✓ | ✓ | ✓ |
| | Visually Clear (100% T) | No Change | ✓ | ✓ | ✓ | ✓ |
| | No Visible Solids | No Change | ✓ | ✓ | ✓ | ✓ |
| Soyol R3-170-E | Yellow Color | No Change | ✓ | ✓ | ✓ | ✓ |
| | Opaque (0% T) | No Further Degradation | | | ✓ | ✓ |
| | Visible Suspended Solids | No Further Degradation | | | ✓ | ✓ |

TABLE-continued

Freeze/Thaw Stability Testing Results

| Sample | Initial Appearance | Number of Freeze/Thaw Cycles 1 | 2 | 3 | 4 | 5 |
|---|---|---|---|---|---|---|
| SoyOyl GC5N | Amber Color | No Change | ✓ | ✓ | ✓ | ✓ |
| | Opaque (0% T) | No Further Degradation | | | ✓ | ✓ |
| | Visible Suspended Solids | No Further Degradation | | | ✓ | ✓ |
| SoyOyl P38N | Amber Color | No Change | ✓ | ✓ | ✓ | ✓ |
| | Visually Clear (100% T) | 98% T | 96% T | 95% T | 92% T | 90% T |
| | No Visible Solids | Just Visible → Easily Visible → Prominent | | | | |

The Arcol LG-168 sample in the above table illustrates how a traditional petroleum-based polyol can be run through several freeze/thaw cycles without any obvious change in the product appearance. The next three samples demonstrate that three of the inventive polyols go through multiple freeze/thaw cycles without damage to the polyol quality. The next two samples are other commercially available soy-based polyols that in their original form are opaque to visible light and already full of suspended solids. Subjecting these two products to a number of freeze/thaw cycles gave no evidence of further degradation.

The SoyOyl P38N is a commercially available polyol that begins with characteristics of visual clarity and no evidence of visible solids. With each successive freeze/thaw cycle, this material changes in visual clarity due to the formation of an increasing concentration of visible particles.

General Continuous Process Examples

Example 1

This example utilizes an aging continuous stirred tank reactor (CSTR), a low temperature vacuum strip CSTR, and high temperature vacuum strip CSTR.

A CSTR reactor is first heated to the reflux temperature of the reactants (100-110° C.) as it is continuously charged with vegetable oil, hydrogen peroxide diluted to the required concentration, and an organic acid having from 1 to 3 carbon atoms. The flow rates of reactants are adjusted to allow enough residence time for the reactants to achieve residual epoxide level of ≤0.7% w/w of oxirane oxygen. Once the reactor is 90% full, the outflow from the first CSTR is fed into a second CSTR. At this stage this reactor is at a steady state with the continuous flow of reactants into the reactor and the constant outflow of reaction mixture containing a crude polyol product into the second CSTR.

The second CSTR is maintained at 140° C.-160° C. and 20-50 mm Hg. At these conditions, the bulk of the organic acid and water are constantly distilled off the outflow from the first CSTR. The acid number of the polyol is reduced to about 6-10 mg KOH/g in this CSTR.

A constant stream of semi-refined product is withdrawn from the second CSTR and is charged into a third CSTR that is maintained between 235° C.-255° C. and at 5-10 mm Hg where it is further reacted. The feed rate to this reactor is adjusted such that the residence time in this reactor allows for reduction of acid number down to 2 mg KOH/g or less. The overflow from the third CSTR is discharged into product storage tank, maintained under nitrogen padding, where the product is cooled to the packaging temperature (about 50° C.)

Example 2

This example utilizes an aging CSTR, a flash tank, and a wiped film evaporator.

The first step in this continuous process comprises charging vegetable oil, hydrogen peroxide diluted to the required concentration and an organic acid, continuously into a CSTR reactor that is maintained at reflux temperature (100° C.-110° C.). The flow rates of the reactants are adjusted to allow enough residence time for the reactants to achieve residual epoxide level of ≤0.7% w/w of oxirane oxygen.

Once the reactor is 90% full and is at steady state, the outflow from the first CSTR is fed continuously through a flash evaporator maintained at 140° C.-160° C. and 20-50 mm Hg. Most of the organic acid and water are flashed off of the product stream from the first CSTR. The acid number of the resultant semi-refined product leaving the flash tank is about 6-10 mgKOH/g.

The semi-refined product is further reacted by feeding it into a wiped film evaporator maintained at 220° C.-260° C. and <1 mmHg. This wiped film evaporator has a wipe speed of about 300 to 350 rpm and the internal condenser temperature is maintained between 35° C. to 70° C.; which allows fatty acid to be collected into a fatty acid holding tank. The product coming out of this wiped film evaporator will be at an acid number of 2.0 mg KOH/g or less and is cooled and stored under nitrogen padding Example 3

This example utilizes an aging CSTR, a low temperature vacuum strip CSTR, and a countercurrent packed column fatty acid strip.

The reactants such as raw vegetable oil, hydrogen peroxide diluted to the required concentration and an organic acid are continuously reacted in a CSTR to the desired residual epoxide level of ≤0.7% w/w of oxirane oxygen, as previously described in Examples 1 and 2.

The outflow from the first CSTR is fed into a second CSTR that is maintained at 140° C.-160° C. and 20-50 mm Hg where the organic acid and water are continuously distilled off of the crude polyol product. The acid number of resulting semi-refined product is about 6-10 mg KOH/g in this CSTR.

A constant stream of semi-refined product is withdrawn from the second CSTR and further reacted at 220° C. to 260° C. by passing it through an inline heat exchanger. This heated product is passed downwardly through a packed column while steam or other inert gas is forced up through the column to remove/react high boiling fatty acids. The final polyol product coming out of the column will have an acid number 2 mg KOH/g or less.

Example 4

This example utilizes an aging CSTR, a low temperature vacuum strip CSTR, and a high temperature steam stripping reactor.

The first two steps of this example are carried out in the same manner as in Example 3. In this example the semi-refined product leaving the low temperature vacuum strip CSTR is fed continuously into a third CSTR. The third CSTR is maintained at 230° C. to 240° C. and is sparged with steam to remove/react the high boiling fatty acids and reduce the acid number to 2 mg KOH/g or less.

Specific Continuous Process Examples

Example 1

This example illustrates aging/initial reaction portions of the continuous process.

In this example, a 15 gallon glass reactor from Chemglass equipped with two overhead condensers and an agitator was used as a process reactor for demonstrating the first stage (aging) of the continuous process. The reactants used in this experiment were RBD grade soybean oil, acetic acid (84% w/w), hydrogen peroxide (50% w/w) and distilled water. These reactants were carefully weighed out into 3 separate five gallon pails. Water was added to the hydrogen peroxide pail, diluting it to a concentration of 43.36% w/w. The water present in the acetic acid (84% w/w) further dilutes the concentration of hydrogen peroxide in the reaction mixture to 35% w/w. These pails were equipped with pumps that were calibrated to the desired flow rate of the respective raw materials.

The reactor was heated using heating mantles and the temperature was controlled using a temperature indicator controller (TIC), set to 105° C. Raw material charging pumps were also turned on simultaneously to feed the reactor. The feed rates of the raw materials were as follows:

| | |
|---|---|
| RBD soybean oil | −41.5 ml/min |
| Acetic acid (84% w/w) | −9.0 ml/min |
| Hydrogen peroxide (43.36% w/w) | −5.1 ml/min |

With these flow rates, the reactor filled up to 90% of its volume in about 15 hours.

The temperature inside the reactor reached about 105° C. within 90 minutes and was maintained between 103° C.-105° C. for the rest of the reaction, while charging reactants continuously. Samples from the reactor were withdrawn intermittently to measure the residual epoxide content. The sample taken after 15 hrs from the start of the reaction had an oxirane oxygen content of 0.697% w/w. At this stage a pump was activated to begin removal of the crude polyol product using a flow rate of 55.6 ml/min, equaling the total of raw material feed flow rates A small sample of reaction mixture obtained from this CSTR was purified in a rotary evaporator to determine the hydroxyl number. The hydroxyl number of this sample was measured as 94 mg KOH/g.

Example 2

This example illustrates the steps of volatile separation and further reaction of the semi-refined polyol product using a series of wiped film evaporators. In this example the step of volatile separation is conducted in three stages.

First the reaction mixture containing the crude polyol product was transferred to a wiped film evaporator feed tank where it was pre-heated to 60° C. A 2" glass wiped film evaporator was preheated to 115° C. Then a vacuum of about 14 mm Hg was applied to the WFE and the wiper speed set at 320 RPM. The reaction mixture was fed at a flow rate of 391 gm/hr into the top of the wiped film evaporator. As the wiper blades apply the reaction mixture onto the walls as a thin film, the low volatile distillates separate out and are accumulated on the walls of the internal condenser maintained at 10° C. then diverted into a receiver. The semi-refined polyol residue continued to flow along the walls of the wiped film evaporator and was collected at the bottom. The polyol exiting the wiped film evaporator had an acid number of about 20 mg KOH/g.

The semi-refined polyol from the first pass through the wiped film evaporator was subjected to a second pass through the wiped film evaporator. The feed rate was 399 gm/hr. The wiped film evaporator was maintained at 115° C. and at 0.1 mm Hg during this stage. The internal condenser was maintained at 70° C. to allow for any fatty acid separation during this stage. The polyol exiting the wiped film evaporator had an acid number of 4.8 mg KOH/g A third pass was conducted at a feed rate of 423 gm/hr. The temperature of the wiped film evaporator was increased to 240° C. to further react the semi-refined polyol and the vacuum was maintained at 0.05 mm Hg. The internal condenser was maintained at 70° C. during this pass, which allows fatty acid to accumulate around the condenser where it was separated out. The polyol coming out of the third pass has an acid number of 0.6 mg KOH/g

Polyurethane Product Examples

Example 1

An open-pour rigid foam, capable of being molded at 6.0 pcf density, is made with a soy polyol having a viscosity 720 cPs, an equivalent weight of 500 g/eq, hydroxyl value of 112 mg KOH/g and an acid no. of 0.4 mg KOH/g. One such suitable polyol is Agrol 3.6, which is made commercially available from BioBased Technologies LLC of Fayetteville, Ark. The polyol blend is composed of 40 parts of Agrol 3.6, 10 parts of Jeffol R-425X (Mannich polyol from Huntsman), 42.7 parts of Pluracol SG-360 (sucrose/glycerin polyol from BASF), 5 parts of glycerin, 0.9 parts of Tegostab B-8407 (silicone surfactant from Evonik), 0.2 parts of Niax A-33 (amine catalyst from Momentive), 0.08 parts of Niax DMEA (amine catalyst from Momentive) and 1.37 parts of water. The viscosity at 25° C. of the polyol blend was measured at 2,230 cPs. The isocyanate is Mondur MR (a 31.7% NCO polymeric MDI from Bayer MaterialScience).

The foams were made using hand-mix techniques. A 1.1/1.0 weight ratio of isocyanate to polyol blend was used to make the foams. The free rise density was 4.3 pcf and can be molded at 6.0 pcf. The compressive strength on the free rise foam was measured at 48 psi.

Reactivity times on the hand mix are as follows:
Cream time=50 seconds
Gel time=162 seconds
Tack Free=252 seconds

Example 2

A 2.7 pcf pour-in-place rigid foam is made with a soy polyol having a viscosity of 4770 cPs, and equivalent weight of 351 g/eq, hydroxyl value of 160 mg KOH/g and an acid no. of 0.4 mg KOH/g. A suitable polyol is Agrol 5.6, which is made commercially available from BioBased Technologies LLC of Fayetteville, Ark. The polyol blend is composed of 30 parts of Agrol 5.6, 64.7 parts of Pluracol SG-360 (sucrose/glycerin polyol from BASF), 0.5 parts of Tegostab B8587 (silicone surfactant from Evonik), 2.5 parts of Polycat 8 (amine catalyst from Air Products) and 2.3 parts of water. The isocyanate is Mondur MR (a 31.7% NCO polymeric MDI from Bayer MaterialScience).

The foams were made using hand-mix techniques. A 1.1/1.0 weight ratio of isocyanate to polyol blend was used to make the foams. The free rise density was 2.69 pcf and the compressive strength was measured at 30.3 psi. The dimensional stability measured at 70° C. as a percent volume change after 2 weeks was 1.61 and at −20° C. the percent change was 0.10.

Hand-mix reactivities were measured in a 32 oz. cup using 50 grams of polyol blend and 55 grams of isocyanate:
Top of cup time=29 seconds
Gel time=52 seconds
Tack Free time=90 seconds

Example 3

A 1.65 pcf pour-in-place flame retarded rigid foam is made with a soy polyol having a viscosity of 1320 cPs, and equivalent weight of 428 g/eq, hydroxyl value of 129 mg KOH/g and an acid no. of 0.4 mg KOH/g. A suitable polyol is Agrol 4.3, which is made commercially available from BioBased Technologies LLC of Fayetteville, Ark. The polyol blend is composed of 35 parts of Agrol 4.3, 30 parts of Pluracol SG-360 (sucrose/glycerin polyol from BASF), 2.0 parts of L6970 (silicone surfactant form Momentive), 2 parts of Polycat 8 (amine catalyst from Air Products), 17 parts of Celltech TCPP (tris-(chloropropyl)phosphate, a flame retardant from Aceto) and 4 parts of water. The isoycanate is Mondur MR (a 31.7% NCO polymeric MDI from Bayer MaterialScience).

The foams were made using hand-mix techniques. A 1.1/1.0 weight ratio of isocyanate to polyol blend was used to make the foams. The free rise density was 1.64 and the compressive strength was measured at 12.1 psi. The dimensional stability measured at 70° C. as a percent volume change after 2 weeks was 0.91 and at −20° C. the percent change was 0.20.

Hand-mix reactivities were measure in a 32 oz. cup using 50 grams of polyol blend and 55 grams of isocyanate:
Top of cup time=21 seconds
Gel time=44 seconds
Tack free time=100 seconds

Example 4

Two 1.3 pcf slabstock foams were prepared using handmix techniques. One was a control containing no soy-based polyol and the other was formulated with 20 parts of Agrol 3.6 (a soy polyol having a viscosity of 720 cPs, an equivalent weight of 500 eq/g, hydroxyl value of 112 mg KOH/g and an acid no. of 0.4 mg KOH/g, made commercially by BioBased Technologies LLC of Fayetteville, Ark.), replacing 20 parts of Arcol F-3022, a 3000 molecular weight polyether triol, produced by Bayer MaterialScience. The composition of the foams in parts by weight are shown in the following table:

TABLE 4

| Component | Control | Soy-Containing |
|---|---|---|
| Arcol F-3022 | 94.148 | 74.148 |
| Agrol 3.6 | | 20 |
| Dabco 33LV | 0.038 | 0.038 |
| Niax A-1 | 0.028 | 0.028 |
| DC 5987 (surfactant) | 0.851 | 0.851 |
| Water | 4.707 | 4.707 |
| Dabco T-12 | 0.229 | 0.229 |
| TDI (80/20) at 100 index | 54.968 | 56.74 |

Dabco 33LV is an amine catalyst consisting of 33% triethylene diamine in 67% dipropylene glycol (from Air Products). Niax A-1 is a blowing catalyst consisting of 70% bis (dimethylaminoethyl)ether and 30% dipropylene glycol (from Momentive). DC 5987 is a silicone surfactant (from Air Products). TDI is toluene diisocyanate. The polyols and additives listed in the table were weighed (250 grams) into a 32 oz.

cardboard "chicken bucket" and premixed for 180 seconds at 3100 rpm. The required amount of TDI was added to the polyol blend and mixed at 3100 rpm for 6 seconds. At the end of the mixing cycle, the contents of the bucket were poured into a 12 in.×12 in.×6 in. bakery box and allowed to free rise. The resulting foam is allowed to cure in the box at ambient conditions for 48 hours before removal. The foam is then cut to provide samples for physical testing. Physical properties on the foams are summarized in the following table:

TABLE 5

| Property | Control | Soy-Containing |
|---|---|---|
| Density (pcf) | 1.25 | 1.26 |
| Air Flow (cfm) | 3.78 | 4.30 |
| Ball Rebound (%) | 31 | 27 |
| CFD 50% (N) | 0.44 | 0.44 |
| Compression Set (Ct-50%) | 8.3 | 13.2 |
| Tensile Strength (psi) | 18.0 | 14.0 |
| Elongation (%) | 302 | 203 |

Example 5

Two solid polyurethane castings were prepared in open plastic bread molds using soy-based polyols, Agrol 4.3 and Agrol 5.6, both commercially available from BioBased Technologies, with hydroxyl numbers of 129 mgKOH/g and 160 mg/KOH, respectively. The polyol blends are composed of 74 parts of Agrol and 26 parts of Pluracol SG 360 (sucrose/glycerin polyol from BASF). No catalysts or other additives were used in these formulations. The isocyanate is Mondur MR (a 31.7% NCO polymeric MDI from Bayer MaterialScience) and was used at a 100 isocyanate index. The castings were allowed to cure for 24 hours at ambient temperature in a desiccator, followed by a post-cure in a 40° C. oven for 24 hours and a final post-cure in a 60° C. oven for an additional 24 hours. Upon cooling to room temperature, the plaques were removed and tested for tensile properties and hardness. Samples were also aged for 13 weeks by submerging in 40° C. water and then retesting for tensile strength. No loss in tensile strength was observed indicating that significant breakdown of the polymer structure due to hydrolysis did not occur. The following table summarizes the formulations and physical properties:

TABLE 6

| | Agrol 4.3 | Agrol 5.6 |
|---|---|---|
| Sucrose/Gly Polyol | 26 | 26 |
| Agrol | 74 | 74 |
| Total Polyol | 100 | 100 |
| Polymeric MDI | 44.8 | 50.2 |
| Physical Properties | | |
| Initial Tensile Strength (psi) | 2276 | 4686 |
| Tensile Strength (psi) 13 weeks aged at 40° C. Under water | 2673 | 5006 |
| Initial Elongation (%) | 11 | 9.1 |
| Hardness (Shore D) | 63 | 80 |

While the invention will be described with respect to various embodiments thereof, it will be understood by those skilled in the art that various changes in detail may be made therein without departing from the spirit, scope, and teaching of the invention. Accordingly, the invention herein disclosed is to be limited only as specified in the claims.

In the drawings and specification, there have been disclosed typical embodiments on the invention and, although specific terms have been employed, they have been used in a generic and descriptive sense only and not for purposes of limitation, the scope of the invention being set forth in the following claims.

That which is claimed is:

1. A process for preparing a polyol having an acid number of not more than about 2 mg KOH/g, the process comprising the steps of:

contacting a vegetable oil containing triglycerides with hydrogen peroxide and an organic acid having from 1 to 3 carbon atoms in the presence of water for a sufficient period of time, at a sufficient temperature, and at a sufficient pressure to hydroxylate carbon to carbon double bonds located along the fatty acid moieties of the triglycerides thereby forming a crude polyol product, separating volatiles from the crude polyol product to achieve a semi-refined product, and further reacting the semi-refined product at a sufficient temperature and under a sufficient vacuum to achieve a final polyol product having an acid number of not more than 2 mg KOH/g.

2. A process according to claim 1 wherein the vegetable oil is selected from the group consisting of corn oil, palm oil, palm kernel oil, soybean oil, cottonseed oil, peanut oil, rapeseed oil, safflower oil, canola oil, olive oil, rice bran oil, jatropha oil, algae oil, and sunflower oil.

3. A process according to claim 1 wherein the step of further reacting the semi-refined product comprises heating the semi-refined product at a temperature of at least approximately 170° C. under a vacuum to achieve a final polyol product having an acid number of not more than 2 mg KOH/g.

4. A process according to claim 1 wherein the step of contacting a vegetable oil with hydrogen peroxide and an organic acid at a sufficient temperature to hydroxylate carbon to carbon double bonds comprises contacting the components at a temperature between about 50° C. and about 150° C.

5. A process according to claim 1 wherein the molar ratio of organic acid to vegetable oil ranges from about 0.5/1 to about 10/1.

6. A process according to claim 1 wherein the organic acid is acetic acid.

7. A process of according to claim 1 wherein the molar ratio of hydrogen peroxide to vegetable oil ranges from about 0.1/1 to 6/1.

8. A process according to claim 1 wherein the volatile separation step is conducted under a vacuum at a temperature less than about 170° C. and the further reaction step is conducted under a vacuum at a temperature between about 170° C. and about 270° C.

9. A continuous process for preparing a polyol having an acid number of not more than about 2 mg KOH/g, the process comprising the steps of:

continuously charging a reactor with vegetable oil, hydrogen peroxide, and an organic acid having 1 to 3 carbon atoms wherein the charging is conducted at a temperature sufficient to initiate a reaction and at a flow rate that provides a residence time in the reactor sufficient to achieve a crude polyol product with an epoxide content less than or equal to 0.7 w/w of oxirane oxygen;

continuously transferring the crude polyol product from the reactor to a volatile separation step wherein the crude polyol product is subjected to heat while under vacuum wherein the heat and vacuum and residence time are sufficient to remove volatiles and achieve a semi-refined product; and continuously transferring the semi-refined product of the volatile separation step to a further reaction step where the semi-refined product is subjected to heat while under a vacuum wherein the heat and vacuum and residence time are sufficient to achieve a final polyol product having an acid number of not more than 2 mg KOH/g.

10. A process according to claim 9 wherein the vegetable oil is selected from the group consisting of corn oil, palm oil, palm kernel oil, soybean oil, cottonseed oil, peanut oil, rapeseed oil, safflower oil, canola oil, olive oil, rice bran oil, jatropha oil, algae oil, and sunflower oil.

11. A process according to claim 9 wherein the further reaction step comprises heating the semi-refined product at a temperature of at least approximately 170° C. under a vacuum to achieve a final polyol product having an acid number of not more than 2 mg KOH/g.

12. A process according to claim 9 wherein the molar ratio of organic acid to vegetable oil ranges from about 0.5/1 to about 10/1.

13. A process according to claim 9 wherein the volatile separation step is conducted under a vacuum at a temperature less than about 170° C. and the further reaction step is conducted under a vacuum at a temperature between about 170° C. and about 270° C.

14. A process according to claim 1 comprising the additional step of reacting the final polyol product with an isocyanate.

15. A process according to claim 9 comprising the additional step of reacting the final polyol product with an isocyanate.

16. A process according to claim 9 wherein the further reaction step is conducted in one or more pieces of equipment selected from the group consisting of a high temperature vacuum strip reactor, a wiped film evaporator, a counter current packed column, a distillation column, and a steam stripping vessel.

17. A vegetable oil based polyol having an acid number of 2.0 mg KOH/g or less and comprising 0.1% w/w or less water, 0.1% w/w or less of the organic acid used to prepare the polyol, and triglyceride groups having fatty acid moieties ranging from $C_{16}$ to $C_{18}$ wherein said fatty acid moieties contain pendant carboxylate groups having from 1 to 3 carbon atoms.

18. A vegetable oil based polyol according to claim 17 wherein the vegetable oil is selected from the group consisting of corn oil, palm oil, palm kernel oil, soybean oil, cottonseed oil, peanut oil, rapeseed oil, safflower oil, canola oil, olive oil, rice bran oil, jatropha oil, algae oil, and sunflower oil.

19. A [vegetable oil based polyol according to claim 17 that has been reacted with] *polyurethane comprising a reaction product of the vegetable oil based polyol of claim 17 and* an isocyanate.

*20. A process for preparing a polyol having an acid number of not more than about 2 mg KOH/g, the process comprising the steps of:*

*separating volatiles from a crude polyol product prepared from an epoxidized vegetable oil to achieve a semi-refined product, and*

*further reacting or purifying the semi-refined product at a temperature of at least approximately 170° C. under a vacuum to achieve a final polyol product having an acid number of not more than 2 mg KOH/g.*

*21. A process according to claim 20 wherein the volatile separation step is conducted under a vacuum at a temperature less than about 170° C. and the further reaction or purification step is conducted under a vacuum at a temperature between about 170° C. and about 270° C.*

*22. A process according to claim 20 wherein the further reaction step is conducted in one or more pieces of equipment selected from the group consisting of a high temperature vacuum strip reactor, a wiped film evaporator, a counter current packed column, a distillation column, and a steam stripping vessel.*

*23. A polyurethane comprising a reaction product of the polyol of claim 20 and an isocyanate.*

*24. A process for preparing a polyol having an acid number of not more than about 2 mg KOH/g, the process comprising the steps of:*

*contacting an epoxidized vegetable oil containing triglycerides with an organic acid having from 1 to 3 carbon atoms for a sufficient period of time, at a sufficient temperature, and at a sufficient pressure to form hydroxyl groups from epoxide rings located along fatty acid moieties of the triglycerides thereby forming a crude polyol product,*

*separating volatiles from the crude polyol product to achieve a semi-refined product, and*

*further reacting and purifying the semi-refined product at a sufficient temperature and under a sufficient vacuum to achieve a final polyol product having an acid number of not more than 2 mg KOH/g; and wherein the epoxidized vegetable oil containing triglycerides has the following formula:*

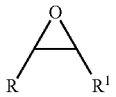

*wherein the R and $R^1$ groups represent the fatty acid moieties of the triglycerides.*

*25. A process according to claim 24 wherein the further reaction or purification step comprises heating the semi-refined product at a temperature of at least approximately 170° C. under a vacuum to achieve a final polyol product having an acid number of not more than 2 mg KOH/g.*

*26. A process according to claim 24 wherein the volatile separation step is conducted under a vacuum at a temperature less than about 170° C. and the further reaction or purification step is conducted under a vacuum at a temperature between about 170° C. and about 270° C.*

*27. A process according to claim 24 wherein the further reaction step is conducted in one or more pieces of equipment selected from the group consisting of a high temperature vacuum strip reactor, a wiped film evaporator, a counter current packed column, a distillation column, and a steam stripping vessel.*

* * * * *